United States Patent [19]

Kaplan et al.

[11] Patent Number: 5,553,283

[45] Date of Patent: Sep. 3, 1996

[54] STORED MAPPING DATA WITH INFORMATION FOR SKIPPING BRANCHES WHILE KEEPING COUNT OF SUFFIX ENDINGS

[75] Inventors: Ronald M. Kaplan, Palo Alto; Martin Kay, Menlo Park, both of Calif.

[73] Assignee: Xerox Corporation, Stamford, Conn.

[21] Appl. No.: 453,612

[22] Filed: May 30, 1995

Related U.S. Application Data

[63] Continuation of Ser. No. 776,909, Oct. 16, 1991, which is a continuation of Ser. No. 563,885, Aug. 6, 1990, abandoned, which is a continuation of Ser. No. 54,462, May 26, 1987, abandoned.

[51] Int. Cl.$^6$ ............................ G06F 17/30; G06F 17/22
[52] U.S. Cl. ................. 395/600; 364/419.1; 364/419.11; 364/419.12; 364/419.13; 364/419.14; 364/419.15; 364/DIG. 2; 364/943.41; 364/943.42; 364/943.43
[58] Field of Search ......................... 395/600; 364/419.1, 364/419.11, 419.12, 419.13, 419.14, 419.15

[56] References Cited

U.S. PATENT DOCUMENTS

| | | | |
|---|---|---|---|
| 4,318,184 | 3/1982 | Millett et al. | 364/900 |
| 4,366,551 | 12/1982 | Holtz | 364/900 |
| 4,450,520 | 5/1984 | Hollaur et al. | 364/900 |
| 4,685,060 | 8/1987 | Yamano et al. | 364/419 |
| 4,744,050 | 5/1988 | Hirosawa et al. | 364/900 |
| 4,758,955 | 2/1988 | Chen | 364/900 |
| 4,771,385 | 9/1988 | Egami et al. | 364/419 |
| 4,777,617 | 10/1988 | Frisch et al. | 364/900 |
| 4,782,464 | 11/1988 | Gray et al. | 364/900 |
| 4,783,761 | 11/1988 | Gray et al. | 364/900 |
| 4,796,185 | 12/1986 | Yoshimura et al. | 364/419 |
| 5,113,340 | 5/1992 | McWherter | 364/419 |
| 5,229,936 | 7/1993 | Decker et al. | 364/419 |
| 5,450,598 | 9/1995 | Kaplan et al. | 395/800 |
| 5,488,719 | 1/1996 | Kaplan et al. | 395/600 |

FOREIGN PATENT DOCUMENTS

| | | |
|---|---|---|
| 0083420 | 8/1987 | European Pat. Off. |
| 0241717 | 10/1987 | European Pat. Off. |
| 0282721 | 9/1988 | European Pat. Off. |
| 0286719 | 10/1988 | European Pat. Off. |

OTHER PUBLICATIONS

James L. Peterson, "Lecture Notes in Computer Science: Computer Programs for Spelling Correction," pp. 57–66, 1980.

(List continued on next page.)

*Primary Examiner*—Paul V. Kulik

[57] ABSTRACT

A compactly stored word list that includes a directed graph data structure is used for word to number (W/N) and number to word (N/W) mapping. Each word accepted by the data structure is mapped to a unique corresponding number within a dense set of numbers ranging from zero to one less than the total number of acceptable words. Some common suffixes are collapsed into shared branches, which is possible because the numbers are not stored within the word list. In addition, some branches of the data structure can be skipped during mapping because of information associated with branch points. That information permits the mapping scan to continue with a next branch or with an alternative branch. That information also indicates the number of suffix endings in the next branch; this number is used to keep a count of the word endings during word to number mapping; it is also used both to determine whether to continue with the next branch and also to reduce the number being mapped during number to word mapping. The branching information includes a full length pointer to the next branch or a shorter length pointer index to a table in which the pointer is stored. In either case, the number of suffix endings in the next branch is annexed to the pointer. The pointers and pointer indexes are assigned iteratively, the shortest pointer indexes first, then longer pointer indexes, and finally the full length pointers. In each case, a pointer or pointer index is assigned only if beneficial, and the assignment of pointers and pointer indexes is cleared and redone if a better assignment can be made.

6 Claims, 14 Drawing Sheets

OTHER PUBLICATIONS

Alan W. Doerr et al., "Applied Discrete Structures for Computer Science", Science Research Associates Inc., 1985, pp. 176–178.

Report R77–008, Bird et al., Operating Systems, Inc., 1977.

Lee A. Hollaar, "Text Retrieval Computers", *Computer*, IEEE, 1979, pp. 40–50.

A. W. Appel et al., "The World's Fastest Scrabble Program," Communications of the ACM, vol. 31 No. 5, May 1988, pp. 572–579.

"Type Right Catches Errors as your Type (Beep Beep)," Xerox Corp., 1986.

"Product Overview for the Memex Information Engine," Memex Information Engines Ltd., Jun. 1986, pp. 7–10, 31–35.

Haskin, R. L. and Hollaar, L. A., "Operational Characteristics of a Hardware–Based Pattern Matcher," *ACM Transactions on Database Systems*, vol. 8, No. 2, Mar. 1983, pp. 15–40.

European Search Report and Annex, Application No. EP 93 30 8298, dated Mar. 4, 1994.

Katajainen, J. and Raita, T., "An Approximation Algorithm for Space–optimal Encoding of a Text," *The Computer Journal*, vol. 32, No. 3, 1989, pp. 228–237.

Srihari, S. N., Hull, J. J. Choudhari, R., "Integration of bottom–up and top–down contextual knowledge in text error correction," *AFIPS Conference Proceedings, 1982 National Computer Conference* Jun. 7–10, 1982, Huston, Tex., pp. 501–508.

Hull, J. J., Srihari, S. N. and Choudhari, R., "An Integrated Algorithm for Text Recognition: Comparison with a Cascaded Algorithm," *IEEE Transactions on Pattern Analysis and Machine Intelligence*, vol. PAMI–5, No. 4, Jul., 1983, pp. 384–395.

Lucchesi, C. L. and Kowaltowski, T., "Applications of Finite Automata Representing Large Vocabularies," *Software–Practice and Experience*, vol. 23, No. 1, Jan. 1993, pp. 15–30.

Revuz, D., "Minimisation of acyclic deterministic automata in linear time," *Theoretical Computer–Science, vol. 92, No. 1, Jan. 1992, pp. 181–189.*

| Address | Char | F | EOB | ALT | PTR | F-Size |
|---|---|---|---|---|---|---|
| 0 | D | 0 | 0 | 0 | | |
| 1 | I | 0 | 0 | 1 | | |
| 2 | | | | | 7 | 5 |
| 3 | R | 0 | 0 | 0 | | |
| 4 | I | 0 | 0 | 1 | | |
| 5 | | | | | 7 | 5 |
| 6 | O | 0 | 0 | 0 | | |
| 7 | P | 1 | 0 | 0 | | |
| 8 | P | 0 | 0 | 1 | | |
| 9 | | | | | 11 | 3 |
| 10 | S | 1 | 1 | 0 | | |
| 11 | E | 0 | 0 | 1 | | |
| 12 | | | | | 16 | 2 |
| 13 | I | 0 | 0 | 0 | | |
| 14 | N | 0 | 0 | 0 | | |
| 15 | G | 1 | 1 | 0 | | |
| 16 | D | 1 | 1 | 1 | | |
| 17 | R | 1 | 1 | 0 | | |

*FIG. 2*

STORED MAPPING DATA WITH INFORMATION FOR SKIPPING BRANCHES WHILE KEEPING COUNT OF SUFFIX ENDINGS

This is a continuation of application Ser. No. 07/776,909, filed Oct. 16, 1991, which was a continuation of application Ser. No. 07/563,885, filed Aug. 6, 1990, abn. which was a continuation of Ser. No. 07/054,462 dated May 26, 1987, abn.

BACKGROUND OF THE INVENTION

The present invention relates to the mapping of words into numbers and of numbers into words. More specifically, the invention relates to techniques for handling a given word within a digital data processing system by mapping that word into a unique number and, when necessary, mapping the number back into the word.

In general, to handle a string of elements such as a word in a digital data processing system, it is frequently desirable to map the word into a number. While words vary greatly in length, a word's corresponding number can ordinarily be expressed digitally as a binary number of a fixed length shorter than the digital codes for that word's alphabetical characters, so that handling the corresponding binary numbers is far more efficient than handling the words themselves. Another reason for mapping a word into a number is to obtain an address or pointer to access information relevant to that word.

U.S. Pat. No. 4,384,329 describes a technique for accessing synonyms and antonyms in which the first few characters of an input word are used to search an index for an address of a segment of a vocabulary data base containing the input word. That segment is then searched for a matching word with which is stored a word number, which is the row and column corresponding to the input word in a synonym or antonym matrix. The matrix is then accessed to retrieve a row of encoded synonymy information, which is then decoded into column displacements. The displacements are converted into a list of synonym word numbers, and these numbers are decoded into the synonyms themselves, again using the index. This technique thus involves mapping an input word to a number, using that number to retrieve the numbers of its synonyms, and mapping the synonym numbers to the synonymous words. Mapping words to numbers and numbers to words is an important part of this technique.

Published PCT Application WO85/01814, corresponding to U.S. patent application Ser. No. 543,286, discusses data compression techniques in which a dictionary assigns a unique address or token to each word of the text being compressed. A special bit is set in the code for the first character of each word, and these special bits are counted while scanning the dictionary until a given word is found, so that the count of special bits is the token representing that word. A lookup table for accessing the first word beginning with each alphabetic letter also provides the token for each first word, so that the counting is speeded by beginning with the token from the table. Similarly, a token is converted to a word by decrementing the token for each special bit encountered in scanning the dictionary, and the next word after the token reaches zero is the corresponding word. This can be speeded by comparing the tokens in the lookup table with the token in reverse order until the first stored token is found which is less than the token being converted. The word represented by the token being converted can then be found by beginning with the first word corresponding to that token from the table, since that first word begins with the same letter as the word sought. The dictionary may be reduced in size by replacing the initial characters of a word by a number if they are the same as the initial characters of the preceding word.

U.S. Pat. No. 4,597,055 describes a language translator which similarly obtains the serial number of an input word by scanning and counting a special bit, which is set in the first code of each stored word. The stored words and stored sentences are compressed by using codes for combinations of letters. The codes are decoded using a compression table. A sentence may be stored in more than one place, in which case the sentence itself is stored in one place and only the address of that place is stored in the other places.

Ainon, R. N., "Storing Text Using Integer Codes", *Proceedings of the 11th International Conference on Computational Linguistics*, Bonn, West Germany, August 1986, pp. 418–420, describes a text storage technique to facilitate word manipulation and save storage space. The text is stored as a stream of fixed length computer words, each a unique integer code for a corresponding word. The word list used in encoding includes groups of words, with the relative position of a member in a group providing syntactic information, and with the syntactic information depending on which of a number of sets includes the group. Each word is stored in a linked list with links to the base word of its group and to the next word in the group and with an identifier of the set which includes that group. The code table used in encoding indicates the two byte integer codes for words from this word list, each code pointing to the position of the corresponding word in the list. For faster encoding, some words are stored in a hash table which is searched before searching the code table, to save time when encoding common words. U.S. Pat. No. 4,241,402 describes a finite state automaton (FSA) which can be used to determine whether a received pattern of characters corresponds to one of a number of desired patterns. If so, a state in the FSA is reached which contains a report code identifying the desired pattern which has been matched, and that code, which could be a unique number, is returned. This means that each branch of the FSA contains one or more unique report codes, precluding the collapse of otherwise identical branches into a single branch. In addition, mapping a number back to a word would require searching the FSA until the number was found, a time consuming process.

U.S. Pat. 4,092,729 describes a hyphenation technique which verifies the spelling of an input word by calculating a vector magnitude and angle for the word, the magnitude and angle being used to access a memory. This is an example of mapping a word to a number by hashing, meaning that a computation is performed on the characters of the word to obtain the corresponding number. There are many possible hashing techniques, but hashing generally involves a tradeoff between uniqueness of the corresponding numbers and density of the set of corresponding numbers. The technique of U.S. Pat. No. 4,092,729, for example, is described as producing a unique angle representation, which implies a lack of density, because not all available angle values are used. If density were attained by using all available angle values, then some of the words would probably have the same angle representation, eliminating uniqueness. Uniqueness ensures accurate results and permits number to word mapping, but density permits compact storage.

A number of other techniques for mapping words to numbers or numbers to words are known. Published European Patent Application 158,311 describes apparatus for retrieving or searching character strings in which sequential logic provides a class number in response to an input word. Published European Patent Application 168,814 describes a language processing dictionary in which a pointer corresponding to an input expression is accessed in an index file using a B-tree search. U.S. Pat. No. 4,608,665 describes a dictionary in which the address at which an input word is stored is found by addressing a memory until a word which matches the input word is retrieved.

It would be advantageous to have techniques for mapping words to numbers and numbers to words rapidly using a compactly stored word list. It would further be advantageous if such techniques mapped a set of words to a dense set of numbers, each corresponding to only one of the words.

SUMMARY OF THE INVENTION

The present invention provides techniques for rapidly performing word-to-number (W/N) and number-to-word (N/W) mapping between a set of words and a dense set of numbers, each corresponding to only one of the words and therefore being unique. The invention provides a good space-time compromise in another respect because it is applicable to a very compactly stored word list which can be searched by a directed graph search and in which common suffixes are collapsed together into shared branches. The word list may, for example, be stored in a finite state machine (FSM) data structure within which pointers are used to collapse common suffixes into shared branches. Information associated with the compact word list allows the skipping of branches so that the word list may be rapidly scanned during mapping.

One aspect of the invention is based on the recognition that the conventional techniques for W/N or N/W mapping with a dense set of unique numbers use too much memory space. These techniques typically store all or nearly all of the characters of each word or else store the numbers being assigned. This aspect of the invention is further based on the discovery that the necessary memory space can be reduced if the numbers are not stored, because then the words can be stored in a directed graph, such as an FSM, in which common suffixes of words are collapsed together, also reducing the number of stored characters. A common suffix is collapsed into a shared branch which is stored in one location and which is reached from other locations through data indicating its location, such as a pointer or an index to a table of pointers. For compactness, however, a pointer or pointer index is used to indicate the location of a branch only when smaller than the branch to which it points.

Another aspect is based on the realization that some branches are pointed to more often than others, and that a more compact encoding can be achieved by judiciously using fewer bits to represent the more frequently used pointers. For example, fewer bits can be used by replacing each occurrence of a pointer with an index shorter than the pointer, the index indicating an entry in a table of pointers which contains the represented pointer. The technique of the invention assigns pointers and pointer indexes iteratively to obtain the best allocation among the available lengths, with the shorter pointer indexes being assigned before the longer pointer indexes, and the full length pointers being assigned last. After assigning the pointer indexes, the assignment is checked to determine whether it would be better to give up a shorter pointer index to obtain a number of longer pointer indexes, in which case the pointer indexes are reassigned.

After the full length pointers are assigned and loaded in the pointer index tables, the entries in the tables are checked to determine whether any entry overflows the available entry length, and if an entry overflows, all the pointer indexes and pointers are reassigned to eliminate the overflow.

Mapping is performed by scanning through the directed graph, keeping a count of suffix endings which depends on the path followed in scanning. Therefore, mapping can be performed between one of the words having a common suffix and its corresponding number based on the path followed while scanning through the directed graph to the shared branch, not based solely on where the scan path ends.

Another aspect of the invention is based on the recognition that an accurate count of suffix endings must be kept while scanning. A directed graph can be scanned while searching for a word and keeping a count of suffix endings to perform W/N mapping and can be scanned while keeping a count of suffix endings and keeping a record of the current word to perform N/W mapping. In either case, the scan will be slow if it must find every suffix ending as it proceeds through the directed graph. This aspect of the invention is further based on the discovery that scanning can be speeded by skipping one or more branches of the directed graph, and on the further recognition that if a branch point has a next branch and also has an alternative branch, the next branch can be skipped during mapping if certain additional information is included in the directed graph.

The additional information includes branching information so that a scan can either continue with the next branch or alternatively skip it and continue with the alternative branch. For example, a pointer or pointer index may be inserted after a branch point in the data structure, indicating the location of its next branch. The alternative branch may begin after the pointer or pointer index, so that the next branch can be skipped by skipping over the pointer or pointer index. A pointer indicates where the next branch continues, while a pointer index indicates an entry in a lookup table which includes a pointer to where the next branch continues.

The additional information also includes suffix ending information which can be used to maintain the count of suffix endings which depends on the scan path followed. For example, the suffix ending information may indicate the number of suffixes which have endings in the next branch, so that the count of suffix endings can be maintained by adding or subtracting the indicated number if the next branch is skipped. This number may be annexed to the pointer indicating where the next branch continues, for example. Because of this arrangement of data, the invention has the advantage that pointers introduced to reduce storage space also reduce processing time.

In one W/N mapping technique according to the invention, the number of suffix endings in a next branch is added to a count of suffix endings if that branch is skipped while searching for the suffix ending of the word being mapped. When that suffix ending is reached, the count of suffix endings is the corresponding number. Similarly, in performing N/W mapping, the number of suffix endings in a next branch is subtracted from the number being mapped if that branch is skipped and a word which corresponds to the path followed through the directed graph to the current location is stored in a stack. The word in the stack when the number reaches zero is the word corresponding to the number. In determining whether to skip the next branch, the current value of the number being mapped is compared with the number of suffix endings in that branch to determine whether the corresponding word's suffix ending is in that branch.

A stored word list according to the invention may be used in a device in which information associated with a word is retrieved based on the number to which that word is mapped. It could also be used to compress and decompress text.

These and other objects, features and advantages will become more apparent from the following description, together with the attached drawings and the appended claims.

BRIEF DESCRIPTION OF THE DRAWINGS

FIG. 2 is a schematic listing of data corresponding to the word list excerpt of FIG. 1 and stored according to the invention.

DETAILED DESCRIPTION

A. General Description

Figure 1:
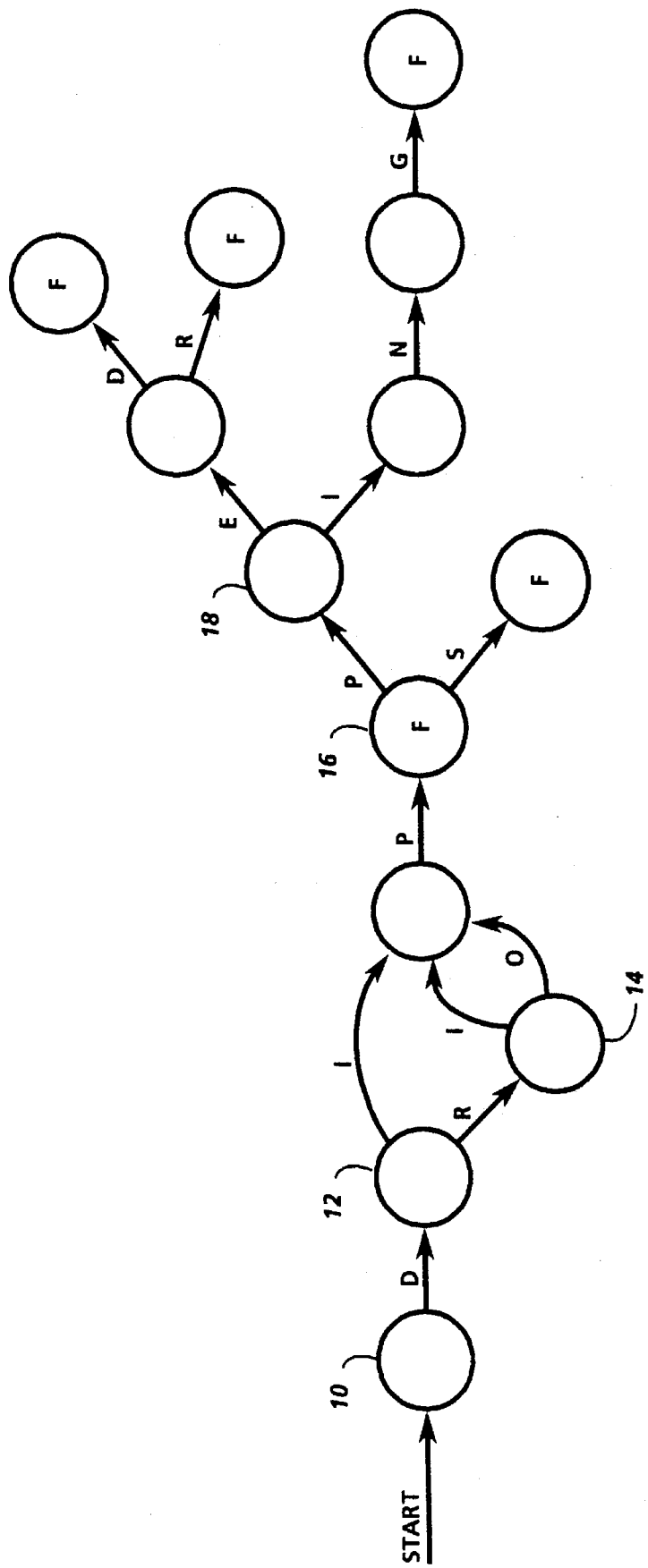
FIG. 1 is a state-transition diagram of an excerpt from a word list.

The general features of mapping techniques according to the present invention can be understood from FIGS. 1 and 2. FIG. 1 is a graphical representation of a directed graph which includes fifteen words—dip, dips, dipped, dipper, dipping, drip, drips, dripped, dripper, dripping, drop, drops, dropped, dropper and dropping. FIG. 2, on the other hand, shows a stored word list corresponding to the directed graph of FIG. 1.

FIG. 1 shows a representation of a directed graph in terms of transitions and states. Each transition in FIG. 1 is labeled with an associated character, and the state after the final character of an acceptable word is marked with an "F", indicating a valid final character. If the characters of one of the acceptable words are applied in sequence, beginning at start state 10, they will lead to one of the states marked "F" along a sequence of transitions and states representing a path through the directed graph. The word "dip", for example, leads to state 16. Therefore, the directed graph represented in FIG. 1 can be used to determine whether an input word is one of the acceptable words, like an ordinary FSM, and could be used for spelling checking and similar applications.

FIG. 1 represents the acceptable words or strings of elements as beginning at the left and ending at the right, as will be described in more detail below. For purposes of this description, the term "prefix" means any combination of characters or other string elements at the beginning of an acceptable string, and is represented in FIG. 1 by the sequence of transitions and states leading from start state 10 to any of the states. Start state 10 thus represents the end of a prefix with no elements, while state 16 represents the end of the prefixes "dip", "drip" and "drop". Similarly, the term "suffix" means any combination of characters at the end of an acceptable string, and is represented in FIG. 1 by the sequence of transitions and states leading from one of the states of the directed graph to any state which is marked "F". An end of branch state thus corresponds to the beginning of a suffix with no elements, while start state 10 corresponds to a set of suffixes which includes all the acceptable words.

It follows that each state in FIG. 1 represents the end of at least one prefix and the beginning of at least one suffix. In addition, each of the states marked "F" represents at least one suffix ending, because, as noted above, it is a state immediately after the final character of an acceptable word. State 16, for example, corresponds to the suffix endings for the words "dip", "drip" and "drop".

For purposes of the following description, the terms "suffix" and "prefix" are not limited to suffixes and prefixes attached to a root, but have the general meaning set forth above. Therefore, these terms would be equally applicable to a list of strings in which each string is stored in a directed graph with its elements in reverse order, so that suffixes of each string in the directed graph end with the string's first element and prefixes begin with the string's last element. In general, the invention is applicable to any type of finite strings of characters or any other elements, and any such string can be divided before or after any of its elements into a prefix and a suffix.

FIG. 1 illustrates several features of a directed graph word list suitable for the present invention. It is acyclic, which is true of the representation in FIG. 1 because none of the transitions out of a given state lead back to that state, either directly or through some combination of other transitions. This is significant because it ensures a finite number of acceptable words. If a directed graph were cyclic, it could be made suitable for the present invention by somehow ensuring a finite number of acceptable words, such as by limiting the number of cycles which could be made within a single scan of the graph.

In addition, the directed graph represented in FIG. 1 is convergent, both on the left and on the right, meaning that both prefixes and suffixes may be common to a number of acceptable words. This is significant because the techniques of the invention make use of both convergences in reducing the size of a word list and, at the same time, provide for the mapping of the words in such a list to a dense set of unique numbers. For example, common suffixes are represented respectively in FIG. 1 by multiple incoming transitions to a state. The suffixes "-ps" and "-s" are common suffixes of the words dips, drips and drops. FIG. 1 also represents the collapse of each of these common suffixes into a shared branch, so that "-s", for example, occurs in only one branch rather than occurring once for each acceptable word which ends with that suffix.

The directed graph represented in FIG. 1 can be used for mapping. For example, a number could be associated with the last character of each acceptable word so that when that character is matched, the number is available. This would preclude, however, the collapsing of a common suffix into a shared branch as shown in FIG. 1, since each suffix would include a unique number and would therefore be different than every other suffix. In addition, N/W mapping would be slow because the directed graph would first be searched to find the number being mapped, after which the corresponding word would be determined by finding the string leading to that number.

One aspect of the present invention provides a technique for rapid W/N and N/W mapping which does not preclude collapsing common suffixes. That technique is to map a word to a number by counting the number of suffix endings passed during the search for that word. For example, for the directed graph represented in FIG. 1, the number of the word "dip" would be zero, while the number of the word "drops" would be fourteen. N/W mapping, on the other hand, begins with the number and decrements it for each suffix ending passed in scanning through the directed graph. When the number reaches zero, the scan has reached the suffix ending of the corresponding word, and that word can be provided based on the path followed to reach it.

If it is necessary to count each suffix ending individually, every branch of the directed graph must be scanned, both for W/N and N/W mapping. The two transitions which originate in state 12 illustrate this problem. The first transition, labeled "T", leads to a large branch while the second transition, labeled "R" leads to a different large branch. Therefore, if a search compares the word "drops" with the directed graph represented by FIG. 1, and if the search must go through the entire branch depending from the first transition from state 12 in order to count the suffix endings in that branch, the search will be relatively slow. The same is true for each of states 14, 16 and 18. State 16, for example, has a first transition, labeled "P", which leads to a large branch, while its second transition, labeled "S", together with the state to which it leads, form a very small branch.

One aspect of the invention is based on the recognition that the necessary information for skipping a branch and the number of suffix endings in that branch can be included in the directed graph to make that branch skippable. Rather than counting the suffix endings in a branch, the number of suffix endings can then be added to or subtracted from the running count. This aspect is further based on the recognition that this information may be included in the directed graph by associating it with data which is a branch point from which a scan either goes to the skippable branch or goes to another branch. The skippable branch is referred to herein as the next branch of the branch point, while the other branch is referred to as the alternative branch of the branch point. In general, while searching the directed graph, if a character from the word being searched matches a character in a branch point the search proceeds to the next branch, but if not, the search proceeds to the alternative branch. Data which is not a branch point may nonetheless have a next branch, in which case the search proceeds to the next branch in case of a match but ends in case of a mismatch.

FIG. 2 shows a stored word list implementing the above described aspects of the invention for the directed graph represented in FIG. 1. In the list of FIG. 2, the data stored at each address ordinarily corresponds to one of the transitions shown in FIG. 1, in accordance with the techniques disclosed in copending coassigned U.S. application Ser. No. 08/814,146, continued as application Ser. No. 07/274,701, continued as application Ser. No. 07/619,821, continued as application Ser. No. 07/855,129, now issued as U.S. Pat. No. 5,450,598 entitled "Encoding FSM Data Structures" ("the encoding application"), incorporated herein by reference. These units of data are therefore referred to as transition units, and each transition unit in FIG. 2 includes character data (CHAR) indicating a character corresponding to the transition; final data (F) indicating whether the transition is a suffix ending, meaning it corresponds to the last character of an acceptable word; end of branch data (EOB) indicating whether the transition unit has a next branch; and alternative data (ALT) indicating whether the branch which begins with the transition unit has an alternative branch. As described in the above referenced encoding application, the CHAR, F, EOB and ALT data may all be encoded into a single byte for each transition unit.

The PTR column in FIG. 2 contains pointers which are stored in association with four branch points of the list, each branch point being a transition unit which has both a next branch and an alternative branch. The pointer at address 2 is associated with the transition unit corresponding to the transition from state 12 labeled "T", while the pointer at address 5 is associated with the transition from state 14 labeled "T". The pointer at address 9 is associated with the transition from state 16 labeled "P", and the pointer at address 12 is associated with the transition from state 18 labeled "E". Each pointer indicates the address at which the next branch begins, so that if the next branch is skipped, the pointer is similarly skipped, but if the next branch is not skipped, the pointer is taken. Thus the pointers shown in FIG. 2 permit branch skipping and serve to indicate both the location of the next branch and the location of the alternative branch. An equivalent list could similarly be created in which each pointer, rather than indicating the next branch, would indicate the alternative branch.

A word list stored according to the techniques in the encoding application and a word list stored according to the present invention differ in at least one important respect. In accordance with the invention, additional data is included in the word list about the number of suffix endings in a skippable branch, to permit branch skipping during mapping. The data in the F-size column in FIG. 2, stored in association with each branch point having a skippable next branch, indicates the number of suffix endings within the next branch. Therefore, a count of suffix endings can be maintained even when the next branch is skipped, using the F-size of the next branch. Referring back to FIG. 1, the word "drops", for example, can be rapidly mapped to a number without going through the next branches of the transitions labeled "T", "T" and "P" from states 12, 14 and 16, respectively.

The association of a pointer and F-size with each branch point having a skippable next branch in FIG. 2 thus serves a number of functions. The pointer indicates the location of the next branch. The positioning of the pointer further indicates the location of the alternative branch, because the pointer and F-size are immediately before that location. Therefore, a scan of the directed graph which reaches the branch point can continue with the next branch or can alternatively skip it and continue with the alternative branch. The F-size indicates the number of suffix endings in the next branch, so that a count of suffix endings can be maintained even when the next branch is skipped. Thus this technique is unusual in that it provides both greater speed and more compact storage—greater speed because it permits branch skipping and more compact storage because it permits the collapse of a common suffix into a shared branch.

This aspect of the present invention is applicable to a directed graph data structure in which words or other strings of elements are stored so that they have suffix endings in branches of the directed graph. In general, the directed graph can be stored in a data structure which includes, for each data unit, information indicating the locations of the next branch and the alternative branch, if any; information indicating whether the data unit is an acceptable suffix ending; and, if the data unit is a branch point having a skippable next branch, information indicating the number of acceptable suffix endings within the next branch.

We turn now to techniques for creating and storing a compact word list like that shown in FIG. 2.

B. Word List Creation

Two important factors in the creation of the word list of FIG. 2 are the determination of the F-sizes and the assignment of the pointers. After covering a technique for determining F-sizes, we will cover in some detail a system for using that technique and a number of other techniques to assign pointers and create a word list like that in FIG. 2.

Figure 3:
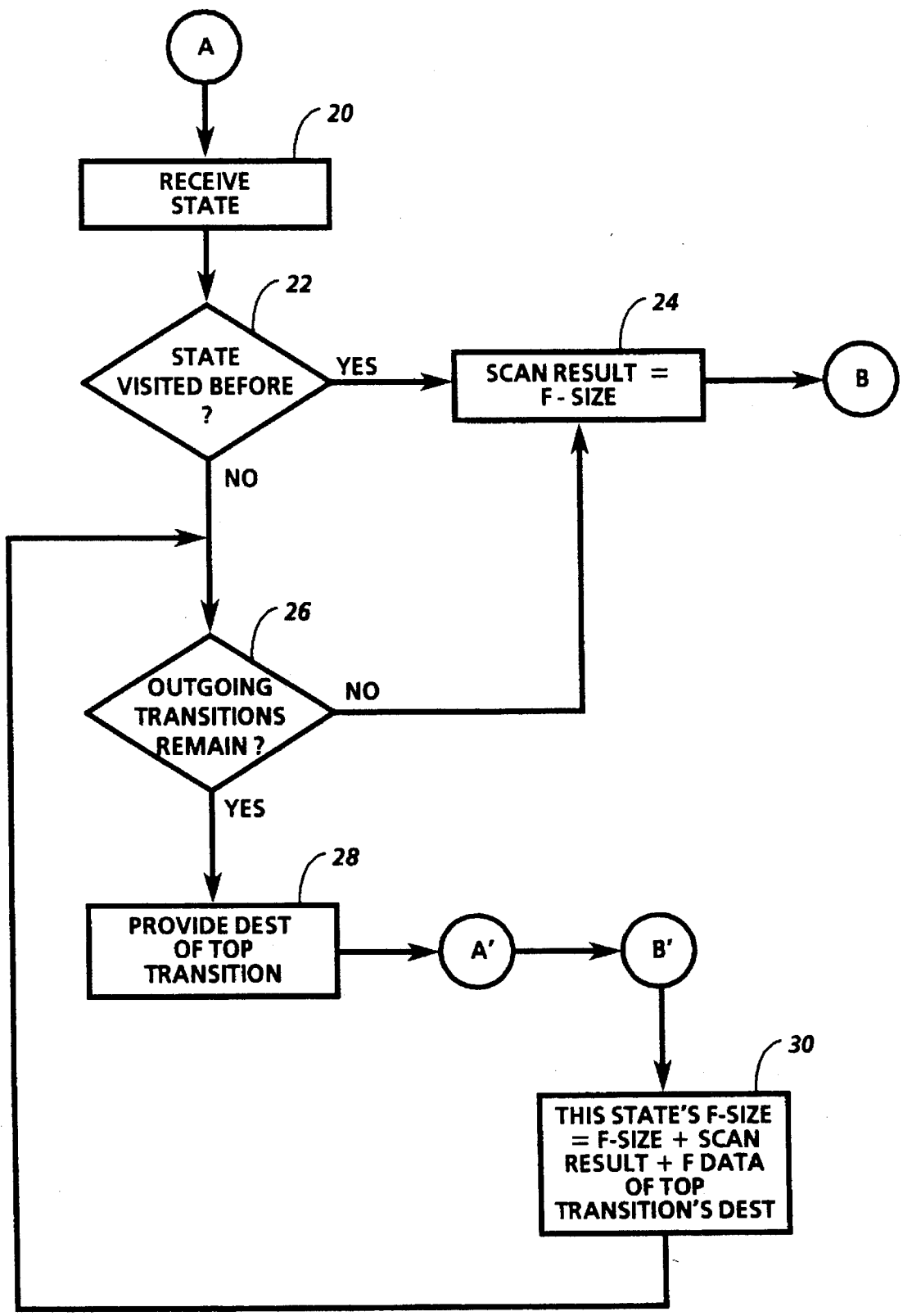
FIG. 3 is a flowchart showing a routine which may be used in storing a word list according to the invention.

1. F-Size Calculation. FIG. 3 illustrates a recursive routine which may be used to obtain the number of suffix endings within each skippable branch. The routine of FIG. 3 relates specifically to the encoding of an FSM data structure in accordance with the above referenced encoding application, application Ser. No. 06/814,146, and is used in conjunction with the features shown in FIGS. 5–10 of that application. In particular, the recursive routine of FIG. 3 closely resembles the recursive routine of FIG. 6 of that application, which is used to measure the actual size of the part of the data structure which depends from each state. The recursive routine of FIG. 3 could be performed before or after the recursive routine of FIG. 6 of that application, however, because the two are independent.

The routine of FIG. 3 begins in box 20 by receiving a state from which a branch of the FSM data structure may depend. The first call of the routine will provide the start state of the FSM data structure, but subsequent recursive calls of the routine of FIG. 3 will provide other states within the FSM data structure. As a result, the routine of FIG. 3 performs a scan through the entire FSM data structure, after which the data unit for each state includes information indicating the F-size, the F-size being the number of acceptable words which have endings within the branch depending from that state. Therefore, the F-size of all the states is initialized to zero before the routine of FIG. 3 is executed. As it goes through the states, it calculates the F-size of each state and also changes a flag within each state to indicate that state has been visited.

The routine of FIG. 3 continues by testing whether the received state has been previously visited in this scan, in box 22. If so, the routine returns a scan result in box 24 to the routine which called it, indicated at B. The scan result is the F-size of the received state, as calculated on the previous visit.

If, on the other hand, the test in box 22 determines that the state has not been previously visited, then the test in box 26 determines whether the state has any remaining outgoing transitions which have not been examined during the current scan. If not, scan result is returned in box 24, as above. But if so, the state which is the destination of the top remaining transition is provided in box 28 to a recursive call of the routine of FIG. 3 at A', which results in a call beginning at A. When that call returns its scan result at B, that result is received by the calling routine at B', and the calling routine proceeds in box 30 to update the F-size of its state by adding the scan result to the previous value of its F-size and also adding the F data of the destination state of the top transition, which will be one if that state is a suffix ending and which will be zero otherwise. The routine then returns to the test of box 26 to determine whether outgoing transitions from its state remain to be scanned.

The order in which the transitions of each state are scanned by the routine of FIG. 3 will depend on the order in which they are arranged within each state's data unit. In order to store the words so that their corresponding numbers correspond to their alphabetical order, the transitions may be arranged in alphabetical order. In order to obtain a compact encoded FSM data structure, however, the transitions may be sorted, for example, according to the number of incoming transitions to each transition's destination state or according to the frequency of occurrence of the character in that transition, with the first transition from each state having the least frequent character. Either of these sorting techniques will assist in eliminating redundancy. Techniques for eliminating redundancy by minimization of an FSM data structure are discussed in copending coassigned U.S. patent application Ser. No. 06/814,147, continued as Ser. No. 07/310,032 and now abandoned, entitled "Spell Checking" ("the spell checking application"), incorporated herein by reference.

Although calculation of F-size makes it possible to associate information with a branch indicating the number of suffix endings it contains, a number of other processes are necessary in order to create and store a compact word list of the type shown in FIG. 2. We turn now to a system which applies those other processes as well.

Figure 4:
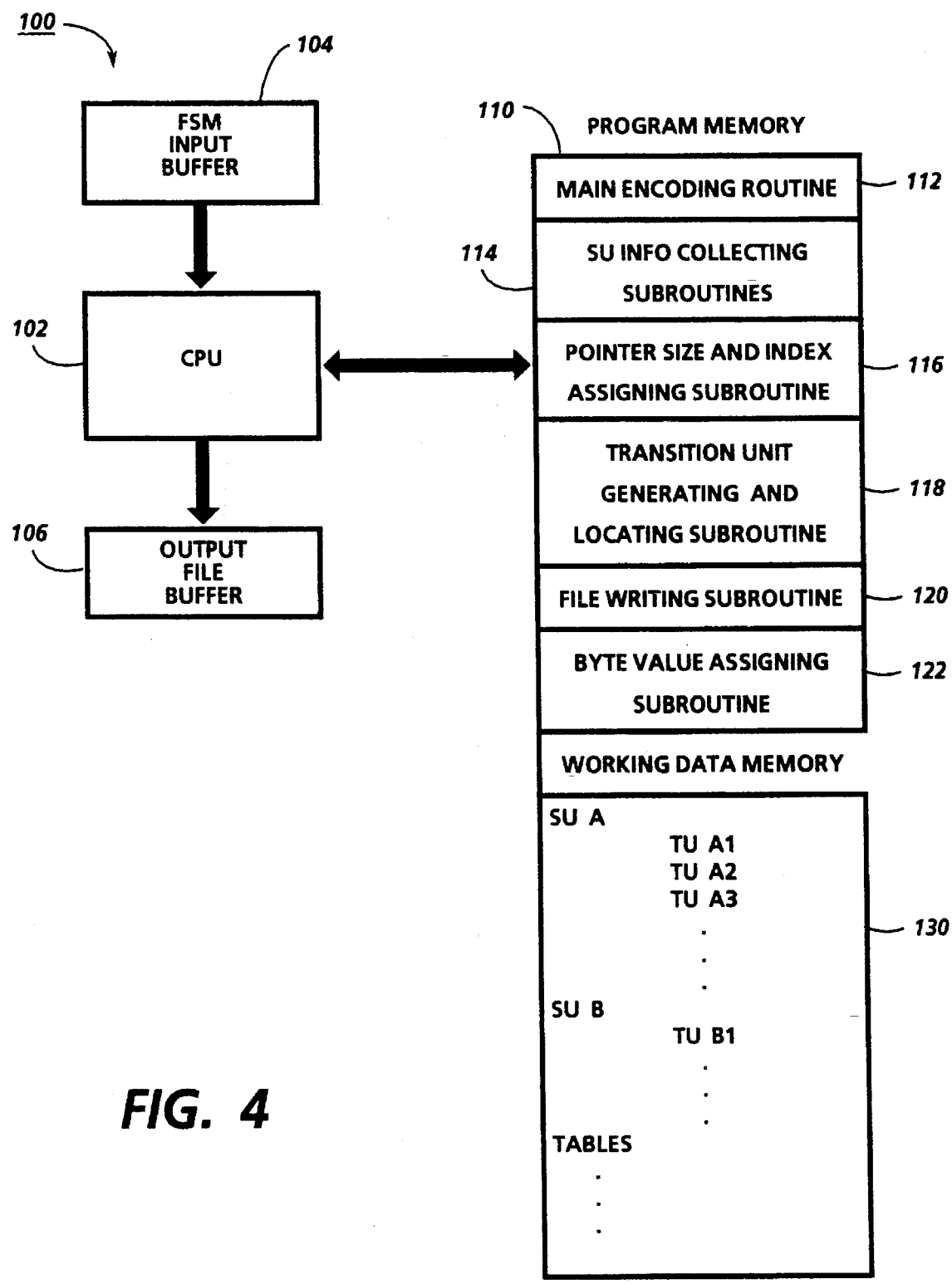
FIG. 4 is a schematic diagram of a data processing system for storing a word list according to the invention.

2. Word List System. FIG. 4 shows data processing system 100 which can be used to store a word list in accordance with the invention. System 100 closely resembles the system described in relation to FIG. 12 of the encoding application, except for the differences noted below. As described there, CPU 102 receives the FSM data structure to be encoded through FSM input buffer 104 and, when encoding is completed, provides an output file through buffer 106. During encoding, it executes software stored in program memory 110, including a main encoding routine 112; state unit information collecting subroutines 114, including both the routine described above in relation to FIG. 3 and also a routine closely resembling that shown in FIG. 6 of the encoding application; a pointer size and index assigning subroutine 116; a transition unit generating and locating subroutine 118; a file writing subroutine 120; and a byte value assigning subroutine 122. During the execution of this software, CPU 102 stores data in and retrieves data from working data memory 130, within which each state's data unit SU and the information about that state's outgoing transitions TU are stored together with a number of tables.

Figure 6:
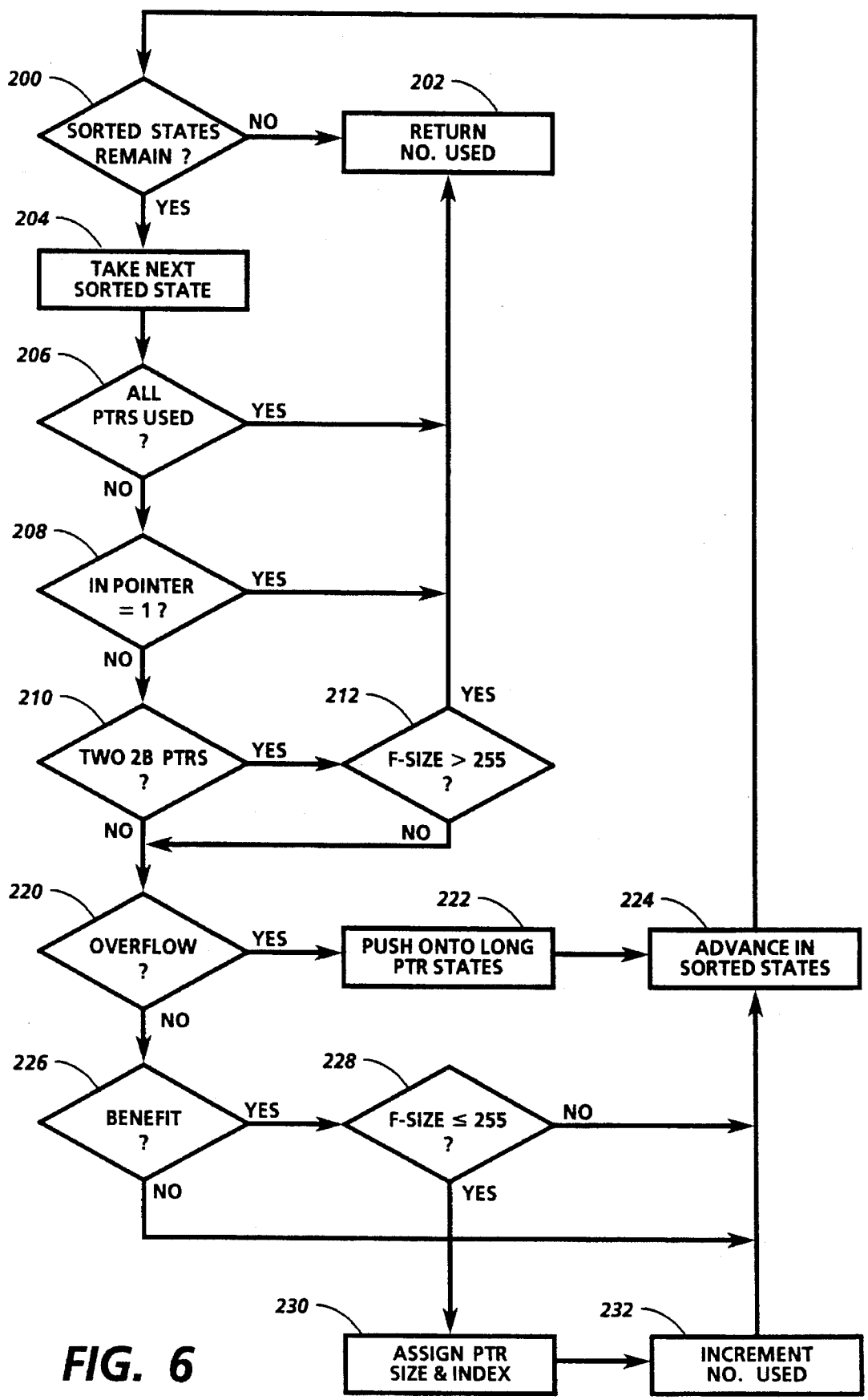
FIG. 6 is a flowchart of a subroutine for assigning short pointers which may be used in the routine of FIG. 5.

As noted above state unit information collecting subroutines 114 includes a routine closely resembling that in FIG. 6 of the encoding application. This routine may differ in the step corresponding to box 94 by testing first whether the first outgoing transition from the state is a non-final epsilon transition; if so, rather than incrementing InPointers for the present state, it is incremented for the destination of the epsilon transition. This routine may similarly differ in the step corresponding to box 102 by making the same test and leaving this state's cost unchanged if a non-final epsilon transition is detected. In addition, the step corresponding to box 101 may be changed by comparing the result with the maximum state cost. If the result exceeds the maximum cost and if this is not the last transition of the present state, the destination is pushed directly onto the root list, the destination's cost is set to the cost of a short pointer and the destination's InPointers is incremented, in which case the steps corresponding to boxes 104-114 can be omitted. In addition, this routine may differ in storing, the first time a state is visited, an indication in the state that the branch depending from it will be stored inline rather than by a pointer even if that branch is a shared branch.

Figure 7:
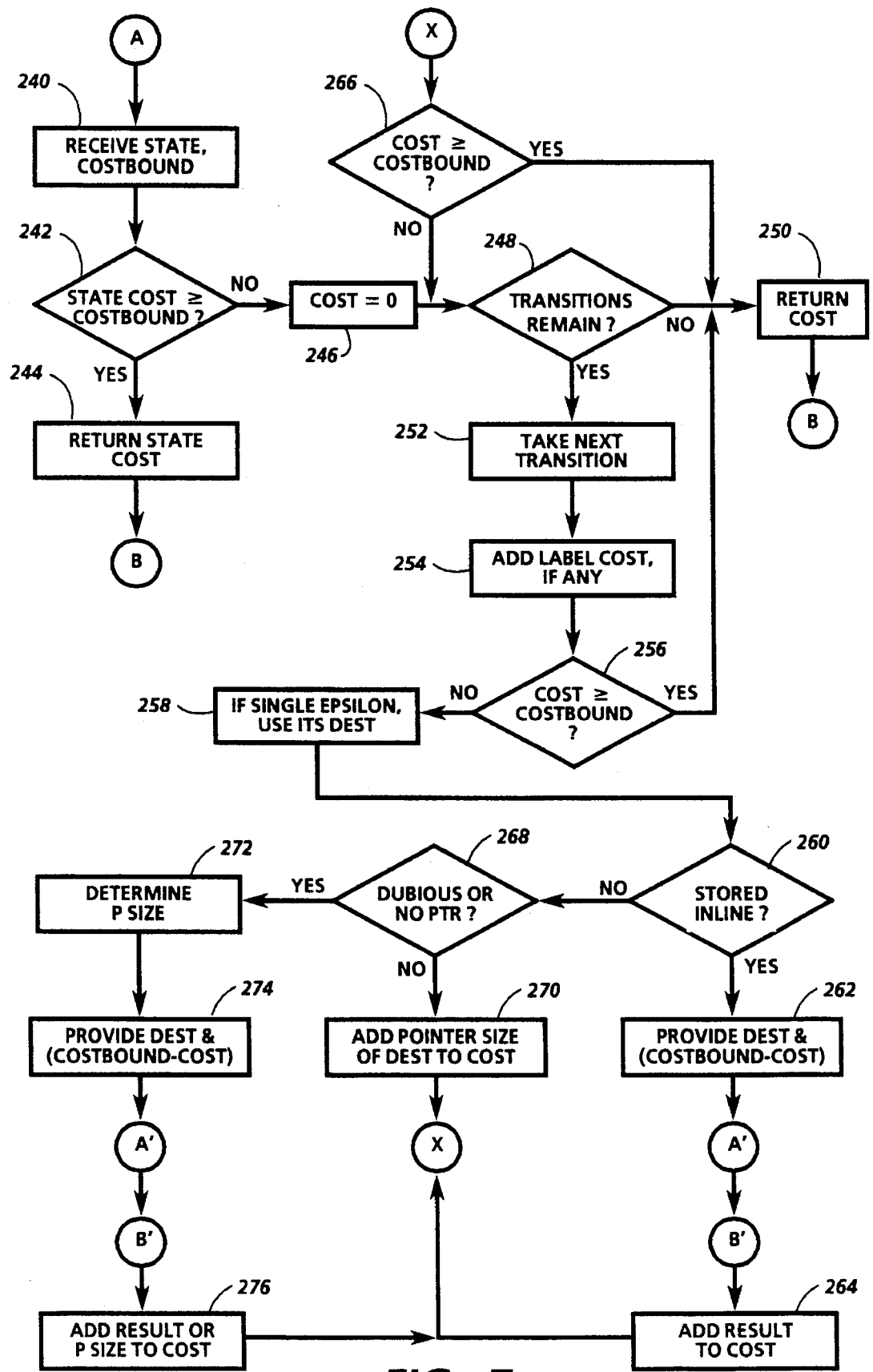
FIG. 7 is a flowchart of a subroutine for determining the space cost of a branch of a data structure which may be used in the subroutine of FIG. 6 and in other subroutines according to the invention.
Figure 8:
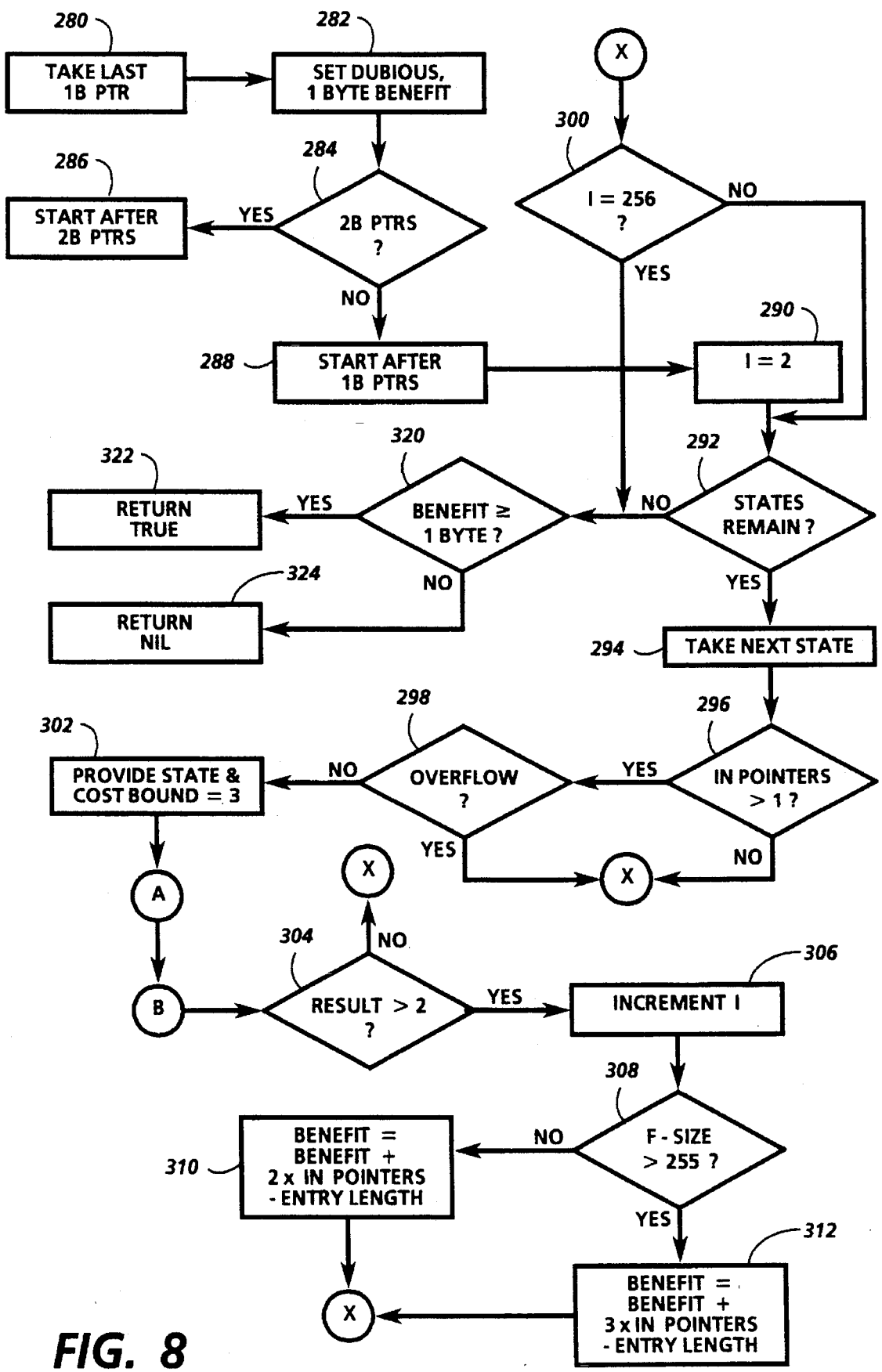
FIG. 8 is a flowchart of a subroutine for adjusting the number of two byte pointers which may be used in the routine of FIG. 5.
Figure 9:
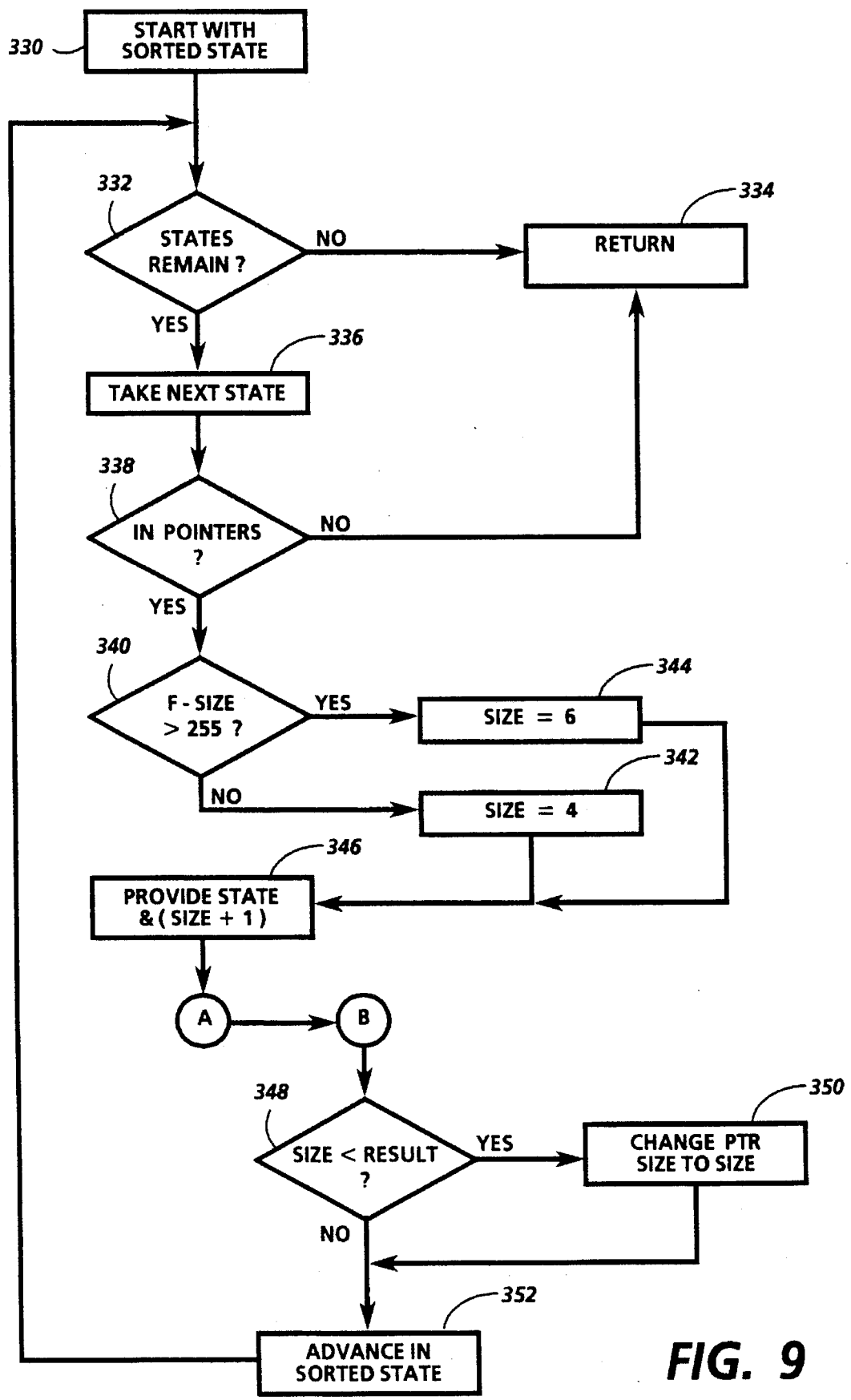
FIG. 9 is a flowchart of a subroutine for assigning long pointers which may be used in the routine of FIG. 5.
Figure 12:
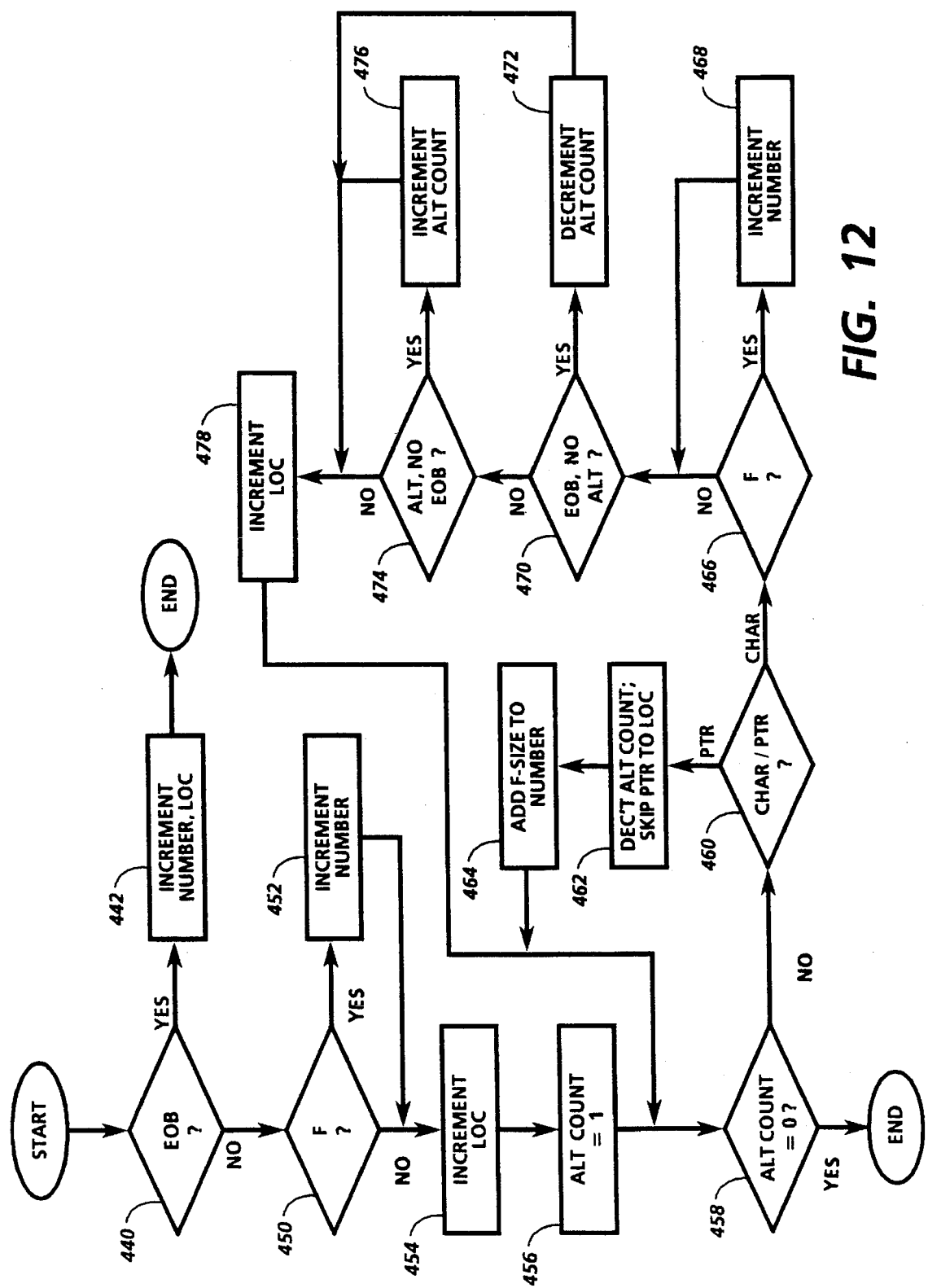
FIG. 12 is a flowchart showing in detail how an alternative transition unit may be found in the method of FIG. 11.

Other differences between the system of FIG. 4 and that shown in FIG. 12 of the encoding application may be understood in relation to subroutines 116, 118, 120 and 122, which differ in several respects from the corresponding subroutines in the encoding application, some of which are described in relation to FIGS. 7–9 of that application. We turn now to examine those subroutines in more detail.

Figure 5:
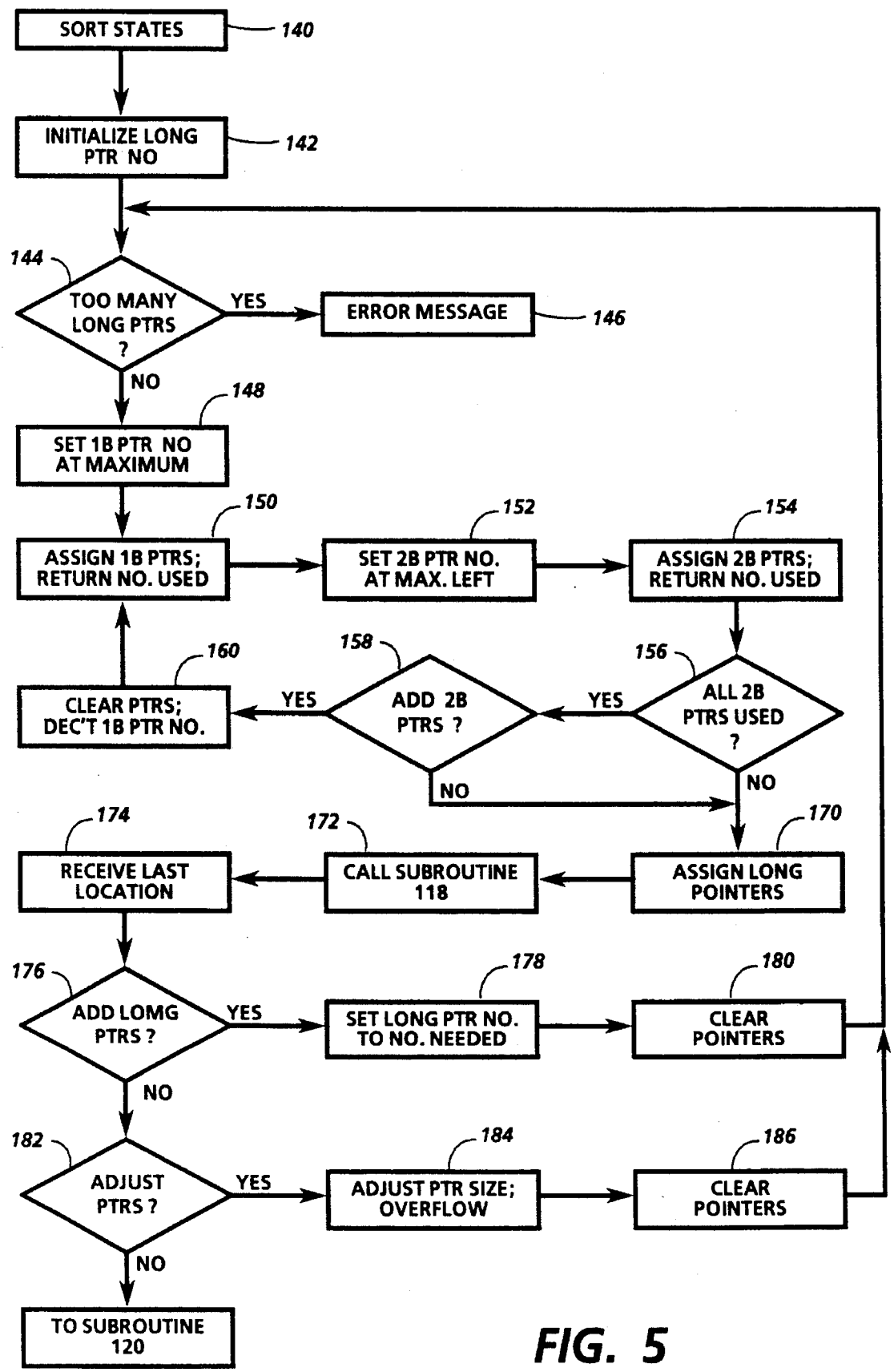
FIG. 5 is a flowchart of a routine for assigning pointers and pointer indexes in accordance with the invention.

3. Pointer Assignment and Other Subroutines. Several of the subroutines described in the encoding application can be used in the present invention. A number of techniques have been subsequently discovered, however, which are particularly useful in relation to pointer size and index assignment. FIGS. 5–10 illustrate pointer-related subroutines which can be used in the present invention.

a. Overall Pointer Assignment Subroutine. Pointer size and index assigning subroutine 116 is similar in function to the routine in FIG. 7 of the encoding application. As noted above, one aspect of the present invention involves including information in the word list so that a branch may be skipped, and that information may include pointers. FIG. 5 illustrates another routine for performing pointer size and index assignment so that those and other pointers are advantageously assigned. As noted below, the routine of FIG. 5 also takes into account the F-size, which is stored in association with each pointer and which therefore affects the pointer assignment decision.

The routine of FIG. 5 begins with the sorting of the states of the FSM, in box 140. In sorting the states in box 140, states with higher InPointers come before states with lower InPointers, and those with equal InPointers are sorted by F-size, with smaller F-sizes preceding larger ones. When the states have been sorted, appropriate variables are initialized in box 142 before beginning the actual assignment of pointers.

The remainder of FIG. 5 is based on the availability of pointers of three bytes and pointer indexes of one and two bytes. Each three byte pointer can itself be used to access the location to which it points, so that each three byte pointer may be the address of the location to which it points or an offset from the current address to the address to which it points, for example. Therefore, the appropriate F-size is stored in relation to each three byte pointer so that the F-size can be retrieved if the branch pointed to is skipped. Each one or two byte pointer index, on the other hand, can be used to access a lookup table containing the appropriate three byte pointer and F-size, so that the F-size need not be stored in relation to a one or two byte pointer index.

If the F-size for a three byte pointer is stored immediately after the pointer, each three byte pointer together with its F-size occupies more than three bytes. In the routine of FIG. 5, for example, each three byte pointer with F-size may be either four or six bytes long—four bytes if the F-size is a single byte and six bytes if the F-size is two bytes, an additional byte of all zeroes being inserted before the F-size to indicate the two byte F-size. It would be possible to use four and five byte lengths, omitting the additional byte of all zeroes, but this would require that the length be decoded from the byte value of the first byte each time a three byte pointer is encountered; two byte F-sizes are so rare in relation to one byte F-sizes that the simplicity gained by avoiding this decoding outweighs the space cost of using a six byte length rather than a five byte length. In the following discussion, these four and six byte pointer/F-size combinations are all treated as long pointers, in contrast to the one and two byte pointer indexes, which are treated as short pointers.

The routine of FIG. 5 is iterative in the sense that pointer indexes and pointers may be repeatedly assigned until the most advantageous assignment is achieved based on predetermined criteria. The iteration path depends on the pointer or pointer index lengths available, with short pointers being assigned first. Then, when the short pointer have been advantageously assigned, the long pointers are assigned. But if a change in the number of long pointers is needed, the process begins again, assigning short pointers first, then long pointers. Therefore, the iterative part of the routine of FIG. 5 begins where it would begin after a change in the number of long pointers, but the initialization in box 142 assigns the lowest acceptable value to LongPtrNo, the number of long pointers, so that LongPtrNo can be incremented in subsequent iterations.

The iterative part of the routine begins with a test in box 144 which determines whether LongPtrNo is too great. This will be the case if all of the available byte values, as shown in FIG. 4 of the encoding application, are inadequate to include all the long and short pointers needed. If this occurs, the routine provides an error message in box 146. But if not, the routine proceeds to set 1 BPtrNo, the number of one byte pointer indexes, to the maximum value it can have, consistent with LongPtrNo and the available byte values. Then the routine begins its inner iterative part, where it begins after a change in the number of one byte pointer indexes, while keeping the value LongPtrNo the same.

The inner iterative part begins in box 150 with the step of assigning one byte pointer indexes. This step is discussed in detail below in relation to FIG. 6. Upon completion of the subroutine of FIG. 6, the number of pointers used is returned, in this case the number of one byte pointer indexes. This number is used to determine the maximum possible two byte pointer indexes within the remaining byte values, in box 152. Then the subroutine of FIG. 6 is again called in box 154 to assign two byte pointer indexes, returning the number of indexes used. The test in box 156 determines whether all of the two byte pointer indexes were used and, if so, the test in box 158 determines whether additional two byte pointer indexes would be beneficial, as described below in relation to FIG. 8. If so, the pointer assignments made thus far are cleared in box 160 and 1 BPtrNo is decremented so that the last one byte pointer index becomes a two byte pointer index and 255 additional two byte pointer indexes are allowed. Then the routine returns to the beginning of the inner iterative part, box 150, to reassign the one byte pointers.

When the tests in boxes 156 and 158 determine that the two byte pointer indexes were not all used or that additional two byte pointer indexes would not be beneficial, the inner iterative part is completed, so that the long pointers are assigned in box 170, as described in detail below in relation to FIG. 9. Then subroutine 118 is called, in box 172, to go through the state units creating transition units and assigning locations to them. Transition unit generating and locating subroutine 118 is substantially the same as the routine in FIG. 8 of the encoding application, except that the cost of a label, instead of being added in boxes 176 or 182, may be added after box 170, but only if the transition is not a final epsilon alternative transition. Also, to take into account the F-size of each state, when a byte location, referred to as a Byte Number in the encoding application, is assigned to a pointer, the F-size may be annexed, whether the byte location is to be included in the encoded data structure or in the appropriate pointer table. Upon completion, subroutine 118 returns the last location, which is received by the routine of FIG. 5 in box 174. The test in box 176 goes through all the state units and computes the number of long pointers codes needed, then compares that number with the number assigned in box 170. If more are needed than were used, LongPtrNo is set to the number of codes needed in box 178, and the pointers which have been assigned are cleared in box 180 before returning to begin the outer iterative part of the routine at box 144. Also, even if enough long pointers codes were used, if the test in box 182, discussed in detail in relation to FIG. 10 below, determines that it is necessary to adjust one or more short pointers, the sizes of those pointers are adjusted and they are indicated as overflow pointers in box 184, before clearing the assigned pointers in box 186 and returning to begin at box 144.

The routine of FIG. 5 continues until the inner iterative part succeeds in assigning the short pointers and the outer iterative part succeeds in assigning the long pointers. Then the test in box 182 will indicate no adjustments are necessary, and control will pass to file writing subroutine 120, which is similar to the routine in FIG. 9 of the encoding application in most respects. In file writing subroutine 120, however, the start state tables are written to include, in addition to the information provided in boxes 212 and 214, the F-sizes at which to begin counting when entering the word list at a given transition, which will be one less than the number corresponding to the first word in the word list which begins with the character corresponding to that transition. The test in box 222 may also test whether the next transition is a non-final epsilon, in which case it would be skipped over. The step in box 224 in FIG. 9 of the encoding application calls byte value assigning subroutine 122 in FIG. 4, mentioned above, in order to obtain the appropriate byte value, but the technique here is substantially the same as assigning a byte value from the byte value table in FIG. 4 of the encoding application. In addition, the F-size is taken into account by including the annexed F-size in any pointer written in the pointer tables or in the data structure.

An additional modification of the routine in FIG. 9 of the encoding application is advantageous to reduce the size of the stored word list by reducing the number of distinct codes used to represent characters. This technique is useful with W/N and N/W mapping, but is also beneficial in other applications of the encoding technique described in the encoding application. This technique is especially advantageous for languages with a large number of distinct characters, such as Japanese or Chinese, and may have particular application in associating kanji or ideographic characters with phonetic strings. The basic technique is to use combinations of more than one code to represent the less frequently occurring characters. For example, a combination including one or more occurrences of a special code, referred to as an escape code, placed before one of the codes used to represent a more frequently occurring character, will represent one of the less frequent characters.

Techniques for decoding these combination codes within the stored word list are discussed below in relation to W/N and N/W mapping, but those techniques require that a special character code table be included in the data structure. For example, this table could, in each byte, include a two bit escape code field indicating the number of escape codes, followed by a six bit character code field containing the common character code which, in combination with those escape codes, represents a corresponding ASCII or other character. Or, if more characters must be represented in this way, it may be better to use only one escape code, but to use each possible value of the next byte after the escape code to represent a corresponding character, without encoding F, ALT and EOB, in which case the table will include in each byte the value which represents the corresponding character, permitting representation of up to 256 characters. Due to the frequency of its use, the character code table should be designed for rapid access.

Upon completion of file writing subroutine 120, the word list is completed. In describing the routine in FIG. 5, however, a number of subroutines were referred to which are shown in more detail in FIGS. 6–10.

b. Short Pointer Assignment. FIGS. 6–8 illustrate subroutines useful in short pointer assignment, as mentioned above in relation to FIG. 5. These subroutines thus play a part in the inner iterative part of the routine of FIG. 5.

FIG. 6 illustrates a subroutine for assigning short pointers which can be used in boxes 150 and 154 in FIG. 5. The subroutine begins with the test in box 200 which determines whether the list of sorted states which have not yet had pointers assigned contains any more states. If not, the number of pointer indexes of the current size which have been used is returned in box 202. But if states remain, the next sorted state is taken as the current state in box 204. The test in box 206 determines whether all available pointer indexes of the current size have been used, in which case the number used is returned in box 202. If not, the test in box 208 determines whether the current state has only one InPointer, in which case the number used is similarly returned in box 202. This is because a short pointer plus the length of the corresponding entry in the pointer table is never advantageous for only one occurrence of a pointer. Finally, the test in box 210 determines whether the current state has a pointer size of two and only two InPointers, in which case, if the test in box 212 determines that its F-size is greater than 255, the number used is returned in box 202. This is because increasing the F-size field associated with a pointer index from one byte wide to two bytes for values greater than 255 adds an unnecessary byte for each of the other table entries, which would be disadvantageous. Sorting the states guarantees that all states later than this one also have F-size greater than 255, so that no more short pointers are used. The various tests in boxes 200, 206, 208, 210 and 212 all serve to determine whether to stop assigning pointers, and if the subroutine gets past them all, it handles the current state.

If the test in box 220 determines that the current state is marked as an overflow state, discussed in detail below in relation to FIG. 10, then it is not assigned a short pointer, but is pushed onto a list of states which require long pointers, in box 222. Then the subroutine advances to the next position in the sorted states in box 224 before returning to the test of box 200. Otherwise, the test in box 226 determines whether the current pointer index size would be beneficial, which may be done with the technique of FIG. 7, discussed below. If so, and if the test in box 228 determines that the current state's F-size is no greater than 255 so that it will fit in a single byte in the lookup table, the current pointer index size and the next index of that size are assigned in box 230. The number of pointers used is incremented in box 232 before advancing in the sorted states in box 224.

FIG. 7 shows a recursive subroutine for determining whether the current pointer size would be beneficial, and which takes into account the F-size. The routine begins when called by receiving in box 240 a state on which to operate and a cost bound below which the current pointer index size is beneficial. If the test in box 242 determines that the state's previously determined cost already is as great or greater than the cost bound, that cost is returned to the calling routine in box 244. Otherwise, a variable Cost is initialized to zero in box 246 and the subroutine begins to examine the outgoing transitions of the state received in box 240.

The test in box 248 determines whether any more outgoing transitions remain to be examined. If not, the subroutine is completed, and the value of Cost is returned to the calling routine in box 250. Otherwise, the next transition is taken in box 252 and its label cost, if any, is added to Cost in box 254. This will be done if this is not the last transition or for a last transition which is not an epsilon transition but leads to a final destination. Then, the test in box 256 determines whether Cost has now reached the cost bound, in which case Cost is returned in box 250 as above. If not, and if the destination of the current transition has a single outgoing epsilon transition, the destination of that transition becomes the destination for the subsequent recursions, in box 258.

The test in box 260 determines whether the branch depending from the current transition is stored inline at this location, which will have been indicated by state unit information collecting subroutines 114, as discussed above. If so, a recursive call is made, after providing the destination and, for the cost bound, the difference between the received cost bound and the value of Cost, in box 262. This recursive call is used to determine the space cost of the branch which will be stored inline. The recursive call begins at A', corresponding to A, and ends at B', corresponding to B in FIG. 7. The result returned by the recursion is added to Cost in box 264, and the subroutine then tests in box 266 whether Cost has now reached the cost bound. If so, Cost is returned in box 250, as above, but otherwise the test in box 248 for remaining transitions is repeated.

If the branch is not to be stored inline, the test in box 268 determines whether the destination is the dubious state, specifically the state which may change from a one byte pointer index to a two byte pointer index as a result of the subroutine in FIG. 8 discussed below, or if it is a state with no pointer size assigned. If neither of these is true, the pointer size of the destination is added to Cost, in box 270, before proceeding to test Cost against the cost bound in box 266. But if either is true, a special value called PSize is determined in box 272, as an estimate of the cost of a pointer which would be used to point to the destination.

If the destination is an overflow state, discussed in relation to FIG. 10 below, PSize starts at four, corresponding to the cost of a three byte pointer with an F-size annexed. Otherwise PSize starts at the length of the current pointer size, which may be one, two or four. But if the destination's F-size exceeds 255, PSize is changed to six, to include a three byte pointer, a byte of all zeroes and a two byte F-size. And if the destination has only one InPointer and the current pointer index size is two bytes, PSize is set to four, since a three byte pointer will be more advantageous than a two byte pointer index with its associated table entry.

When PSize has been determined, a recursive call is made, providing the destination and, as the cost bound, the difference between the received cost bound and the value of Cost, in box 274. This recursire call is to determine the cost of storing the branch if a pointer is not used. As above, it begins at A' and ends at B', returning a result reflecting the cost. The lesser of PSize and the returned result is then added to Cost, because a pointer will be assigned if PSize is less than the cost of the branch. Then the subroutine returns to the test in box 266, as above.

The subroutine of FIG. 7 is rather complex because it must estimate the cost of a given state before the costs of all states depending from it have been precisely determined. It ensures that a pointer will only be assigned when it is beneficial, by providing the cost of the branch which would depend from that pointer. The test in box 226 of FIG. 6 thus compares the cost returned by the subroutine of FIG. 7 with the current pointer or pointer index size. If the current size is less, it would be beneficial to assign a pointer. Otherwise it would not. The routine in FIG. 6, which calls the subroutine of FIG. 7, is used in assigning both one and two byte pointer indexes, in boxes 150 and 154 in FIG. 5.

The test in box 158 in FIG. 5 involves a call to another subroutine, as noted above, to determine whether it would be beneficial to change the last one byte pointer index to a two byte pointer index in order to have an additional 255 two byte pointer indexes. FIG. 8 illustrates a subroutine for that purpose. As will be seen, this subroutine also calls the recursire subroutine of FIG. 7.

The subroutine of FIG. 8 begins by taking the state which has the last one byte pointer index assigned to it, in box 280. That state is set as the dubious state in box 282, meaning that it may change to a two byte pointer index if the subroutine of FIG. 8 concludes that such a change would be beneficial. In addition, the number of InPointers of that state is set as the 1 ByteBenefit, which the benefit of a new two byte pointer index must exceed in order for the change to be beneficial. The test in box 284 then determines whether any two byte pointer indexes have been assigned. If so, the starting point is after the last state with a two byte pointer index, in box 286, but otherwise the starting point is after the dubious state, in box 284. Then a variable I is initialized to 2 before beginning to examine the next 255 states to which two byte pointer indexes could be assigned, in box 290.

The test in box 292 determines whether any states remain on the sorted state list to be examined. If so, the next state is taken in box 294 and the tests in boxes 296 and 298 determine respectively whether it has only one InPointer or is an overflow state. In either case, a two byte pointer index would be inappropriate, so that the test in box 300 determines whether 255 states have been examined and, if not, the subroutine routines to the test in box 292. If a two byte pointer index could be appropriate, the state is provided to the routine of FIG. 7 with a cost bound of three, the appropriate cost bound for determining whether a two byte pointer index is beneficial.

The routine of FIG. 7 is called at A and returns at B with a result indicating the cost of the branch depending from the state. If the test in box 304 determines that the cost of that branch is two or less, there would be no benefit in assigning a two byte pointer index, so the subroutine returns to the test in box 300. Otherwise, I is incremented in box 306 and the test in box 308 determines whether the state's F-size is greater than 255, in which case each incoming pointer would be a three byte pointer rather than a two byte pointer index. If the F-size is 255 or less, the length of the table entry required for an additional two byte pointer index is subtracted from the product of two times the number of two byte pointer indexes, which will be equal to InPointers, and this difference is added to the variable Benefit which keeps track of the total benefit of the two byte pointer index, in box 310. But if the F-size exceeds 255, the entry length is subtracted from the product of four times InPointers, and this difference is added to Benefit. The factor of two which is multiplied with InPointers is the benefit of changing a three byte pointer with a one byte F-size to a two byte pointer index. The factor of four is the benefit of changing a three byte pointer with a byte of all zeroes and a two byte F-size to a two byte pointer index. In either case, when Benefit has been increased appropriately, the subroutine returns to the test in box 300.

When the test in box 300 determines that 255 states have been found which could be changed from three byte pointers to two byte pointer indexes, or when the test in box 292 determines that no more states remain in the root list, the test in box 320 compares Benefit with 1 ByteBenefit, the InPointers of the dubious state. If Benefit is at least as great as 1 ByteBenefit, a true result is returned in box 322, indicating that a change should be made Otherwise, a nil result is returned in box 324, indicating no change. This completes the subroutine of FIG. 8.

Having considered the subroutines which play a role in the inner iterative part of the routine of FIG. 5, we turn now to two subroutines which are used in the outer iterative part.

c. Long Pointer Assignment. FIGS. 9 and 10 illustrate subroutines which are useful in the outer iterative part of FIG. 5, playing a role in long pointer assignment. The subroutine of FIG. 9 assigns long pointers, and the subroutine of FIG. 10 determines whether the pointer assignments require adjustment.

The subroutine of FIG. 9 begins at the start of the remaining sorted states, in box 330, which will be those of the original sorted states which remain after the subroutine of FIG. 6 has been applied both for assigning one and two byte pointer indexes. The test in box 332 determines whether any states remain in the sorted states, and, if not, the subroutine returns to the routine which called it in box 334. But if states remain, the next state is taken in box 336 and if the test in box 338 determines that it has no InPointers, the subroutine similarly returns in box 334.

If the next state has InPointers, the test in box 340 determines whether that state's F-size exceeds 255. If so, a variable Size is set to six, corresponding to the size of the long pointer with F-size attached which is necessary for an F-size greater than 255. Otherwise, Size is set to four. Then the subroutine of FIG. 7 is called, providing the state and, as the cost bound, the value of Size plus one, in box 346. The subroutine is called at A and returns at B with a result indicating the cost of assigning a long pointer to the branch depending from the state. If the test in box 348 determines that this result is greater than Size, then the state's pointer size is set to Size in box 350. Then the subroutine advances in the sorted states in box 352 and returns to the test in box 332. In this way, long pointers of length four bytes or six bytes are assigned to the remaining states for which such pointers are beneficial.

Figure 10:
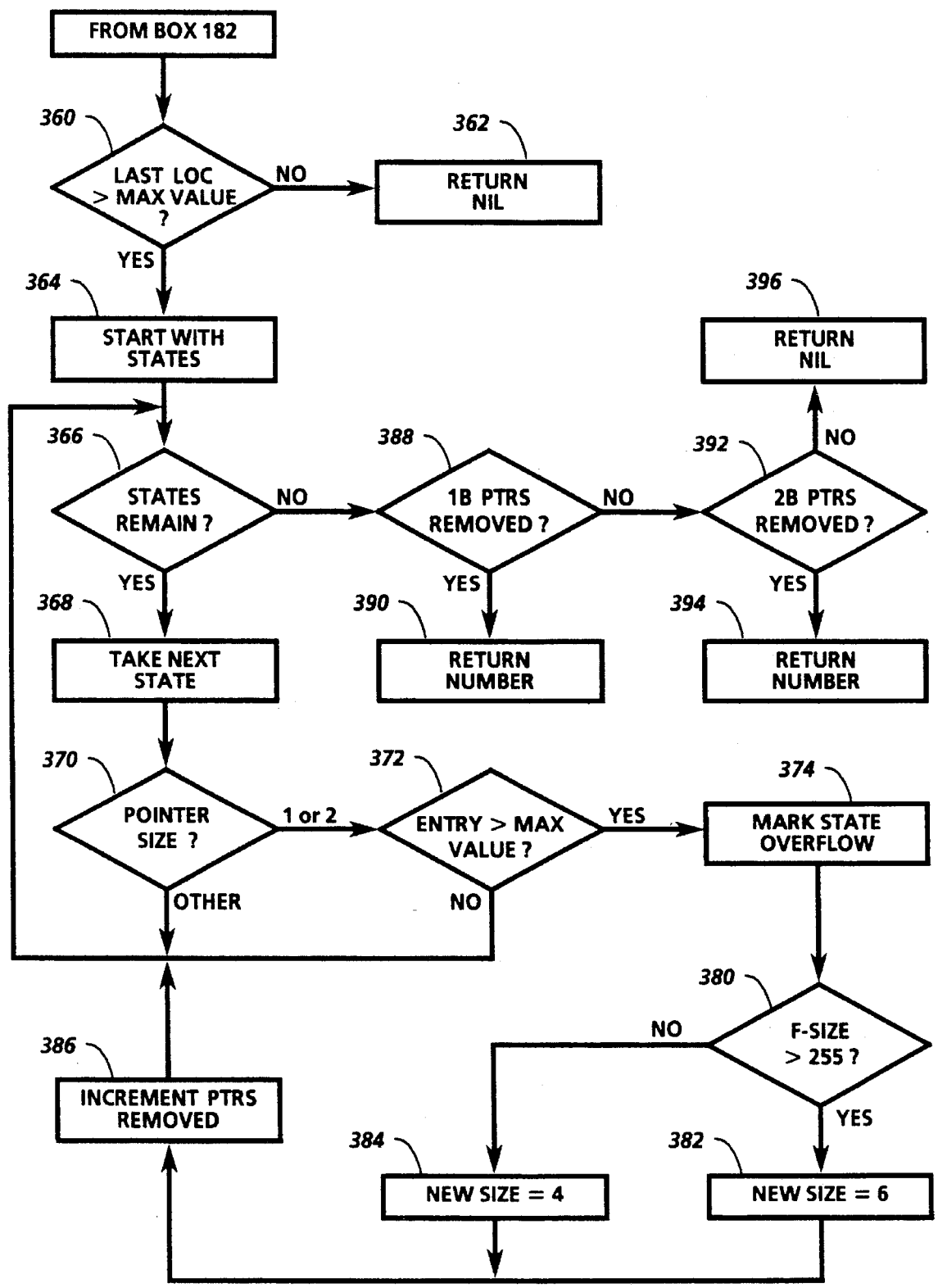
FIG. 10 is a flowchart of a subroutine for finding pointer table entries which overflow and for removing them from the pointer tables.

The subroutine of FIG. 10, called in box 182 in FIG. 5, adjusts the pointer sizes of some states, as in box 184. It also identifies certain states to which long pointers must be assigned and those states are subsequently added to a list of states to which long pointers are assigned, as noted above.

The subroutine of FIG. 10 first determines in box 360 whether the last location in the data structure has a location greater than MaxValue, the highest possible pointer which can be stored in the pointer tables. If not, there is no danger of overflow, so the subroutine returns the value nil in box 362. Otherwise the subroutine starts with all the states of the data structure, in box 364. The test in box 366 determines whether any states remain to be examined. If so, the next state is taken in box 368. If the test in box 370 determines that the pointer size of the state being examined is other than one or two bytes, then the present state does not have a short pointer and will not result in an entry too large for the pointer tables. Even if the pointer size is one or two bytes, if the test in box 372 determines that the pointer table entry for the state is less than MaxValue, there is no overflow and the subroutine returns to the test in box 362.

If an overflow is detected in box 372, the state being examined is marked as an overflow in box 374, so that it will have a long pointer assigned to it in subsequent operations. The test in box 380 determines whether its F-size exceeds 255. If so, it is assigned a new pointer size of six in box 382, but if not it is assigned a new pointer size of four in box 384. After the new pointer size is assigned, a count of the pointer indexes of that size which have been removed is incremented, in box 386. Then the subroutine returns to the test of box 362.

When all the states have been examined, the test in box 388 determines whether any one byte pointer indexes were removed and, if so, the number removed is returned in box 390. If not, the test in box 392 determines whether any two byte pointer indexes were removed and, if so the number removed is returned in box 394. If not, the value nil is returned in box 396, indicating that no overflow was found.

Having discussed in detail the creation of the stored word list, we now turn to its use in W/N and N/W mapping.

C. W/N Mapping

Figure 11:
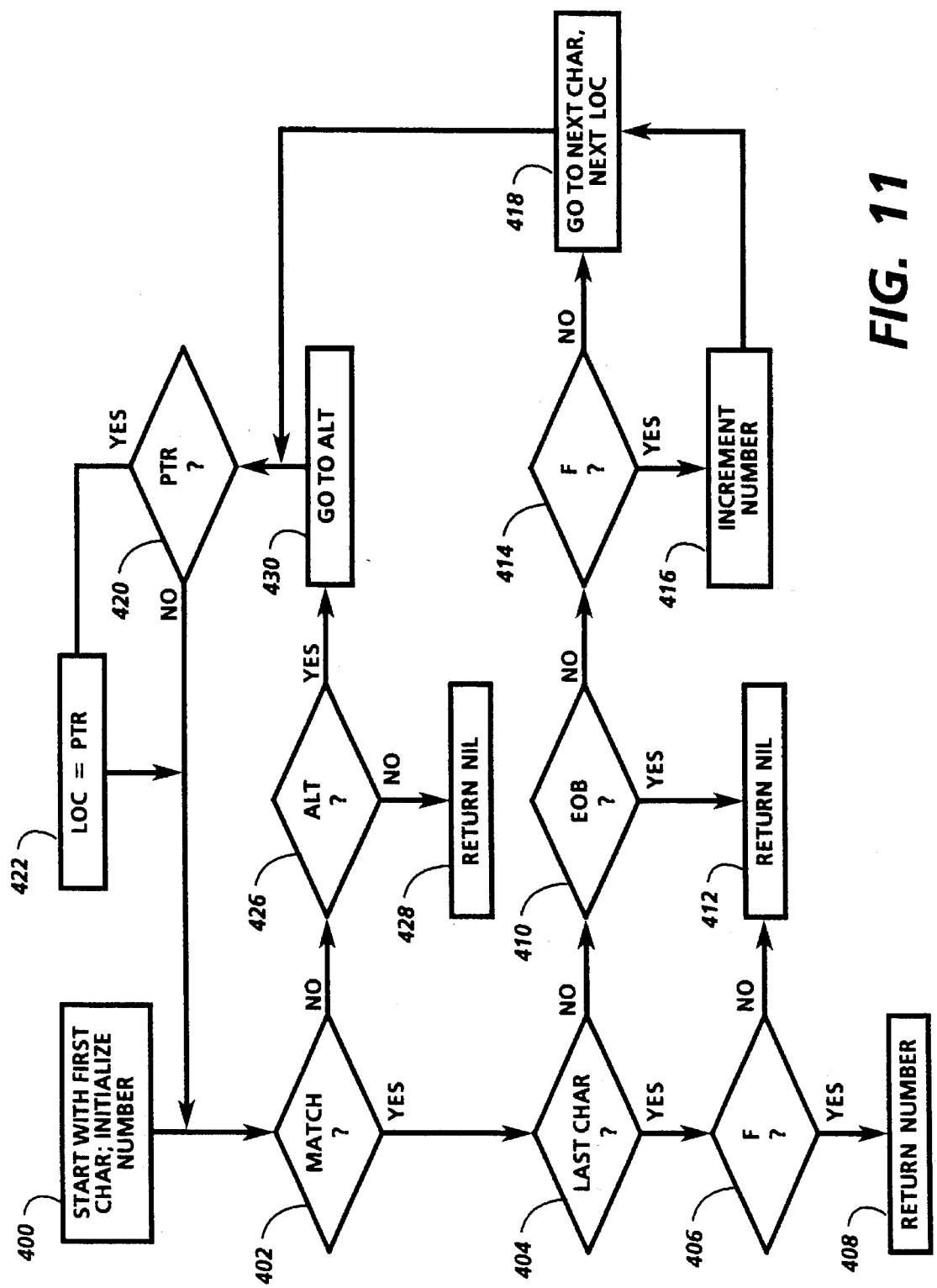
FIG. 11 is a flowchart showing a method of mapping a word to a number according to the invention.

Word-to-number (W/N) mapping can be performed in a number of ways. In accordance with one aspect of the present invention, W/N mapping, like N/W mapping, makes use of a stored word list which includes a directed graph, and some of the branches of the directed graph can be skipped during mapping. FIG. 11 shows a W/N mapping routine according to the invention which is suitable for use with a word list stored as described above.

In FIG. 11, W/N mapping begins in box 400 with the first character of the word being mapped and with a variable Number initialized. Number will eventually take the value of the number to which the word is mapped. For the simple word list of FIG. 2, it would be feasible to start with the first location of the word list and with Number equal to zero, but for a typical large data structure the first character of the word will be used to access a first character table to find the starting location of that character within the word list and to find a number one less than the number of the first accepted word beginning with that character, to which Number is initialized. Then the process of matching the word being mapped begins with the test in box 402. The tests performed on each byte can be based on the manner in which the transition units were encoded into bytes when creating the word list structure, in each case relying on the encoded byte to indicate the CHAR, F, EOB and ALT data of its transition unit.

If the current character of the word matches the CHAR data of the current transition unit, a further test in box 404 determines whether this is the last character of the word being mapped. If so and if the test in box 406 determines that the F data of the current transition unit is set, then Number is returned in box 408 and mapping is complete. But if the F data is not set, or if the current character is not the last character but the test in box 410 determines that the current transition unit's EOB data is set, then the word is not in the word list, and nil is returned in box 412. Otherwise, the test in box 414 determines whether the current transition unit's F data is set and, if so, Number is incremented in box 416. Then the routine proceeds to the next character in the word and the next location in the word list in box 418. If the test in box 420 determines that the next location contains a pointer or pointer index, however, the routine proceeds in box 422 to the location indicated by the pointer at that location or by the pointer retrieved from the appropriate pointer table using the pointer index. Because the pointer is followed rather than skipped, the F-size is not taken into account in this case.

If, on the other hand, the test in box 402 determines that the current character does not match the current transition unit's CHAR data, it is still possible that the word is in the word list if the current transition unit's ALT data is set. If the test in box 426 determines that this is the case, the GoToAlt subroutine in FIG. 12 is performed, as shown in box 430. But if not, nil is returned in box 428 because the word cannot be in the word list.

In FIG. 12, GoToAlt begins in box 440 by determining whether the current transition unit's EOB data is set (in which case the F data must also be set, since every state of the word list which is an end of branch must also be final). If so, the next location in the data structure either contains the alternative or a pointer to the alternative, so Number is incremented and the location is incremented in box 442. Then GoToAlt ends, returning to the routine of FIG. 11 where the alternative is found through the test in box 420.

If, on the other hand, the test in box 440 determines that EOB is not set, the current transition unit's F data is tested in box 450, and Number is incremented in box 452 if the F data is set. Then GoToAlt increments the location in box 454 and initializes a variable AltCount to one (1) in box 456. Until AltCount reaches zero (0), as determined by the test in box 458, GoToAlt proceeds through the locations in the manner described below. But when AltCount reaches zero, GoToAlt ends returning to the routine of FIG. 11, where the alternative is found through the test in box 420.

As it proceeds through the locations, GoToAlt tests in box 460 whether the byte at the current location is an encoded transition unit on the one hand, so that it contains CHAR data, or is a pointer or pointer index on the other. If a pointer or pointer index, AltCount is decremented and the pointer or pointer index is skipped over in box 462. The length of the pointer or pointer index to be skipped over can be determined from the value at that location, in the manner described in the encoding application, Ser. No. 814,146, referenced above, except that the length of long pointers, whether four or six, is determined from the value following the encoded byte as described above. Also, in box 464, the F-size of the skipped branch is added to Number. The F-size is retrieved either directly from a position annexed to the pointer or from the appropriate lookup table. When the F-size has been added, GoToAlt returns to test whether AltCount has reached zero in box 458.

If, on the other hand, the test in box 460 indicates that the byte at the current location is a transition unit, so that it contains CHAR data, GoToAlt tests in box 466 whether the current transition unit's F data is set and, if so, increments Number in box 468. Similarly, GoToAlt tests in box 470 whether the EOB data is set and the ALT data is cleared and, if so, decrements AltCount in box 472. Then, GoToAlt tests in box 474 whether the ALT data is set and the EOB data is cleared and, if so, increments AltCount in box 476. After adjusting Number and AltCount in this manner, GoToAlt increments the location in box 478 before returning to the test in box 458, as above.

The routine of FIGS. 11 and 12 thus performs W/N mapping because it maps every word in a word list to a unique corresponding number. An additional test may be added at the beginning of the routine of FIG. 11 for testing whether the word list accepts a null string when a null string is received. The first accepted word, whether the null string or not, will be mapped to zero, and the last accepted word will be mapped to the integer one less than the number of acceptable words.

As noted above, the characters may be specially coded using escape codes. If this is done, a number of additional steps are taken within the routine of FIG. 11. After receiving each character of a word, whether in box 400 or in box 418, it is necessary to check the escape code data of the character to determine the number of escape codes which will be found in the word list before the character byte. Then, whenever a match occurs in box 402 it is necessary to check whether all of the expected escape codes have been received. If the current transition unit's EOB data is not set and if all of the escape codes before the character byte have been received, the next match in box 402 will compare the next transition unit's CHAR data with the character code field of the character being matched. But if the EOB data is not set and more escape codes are expected, the number of remaining escape codes is decremented before proceeding. In this way, the escape codes in the stored word list are decoded while generally following the routine of FIG. 11.

The conversion of a word to a number thus involves scanning through a stored word list while keeping a count of the number of transition units with set F data, each indicating a suffix ending. When the word is matched, this count is the corresponding number. The key advantage over simple sequential search of the list is that whole branches can be skipped in one quick operation. We turn now to N/W mapping, which similarly scans through a stored word list, but with major differences.

D. N/W Mapping

Figure 13:
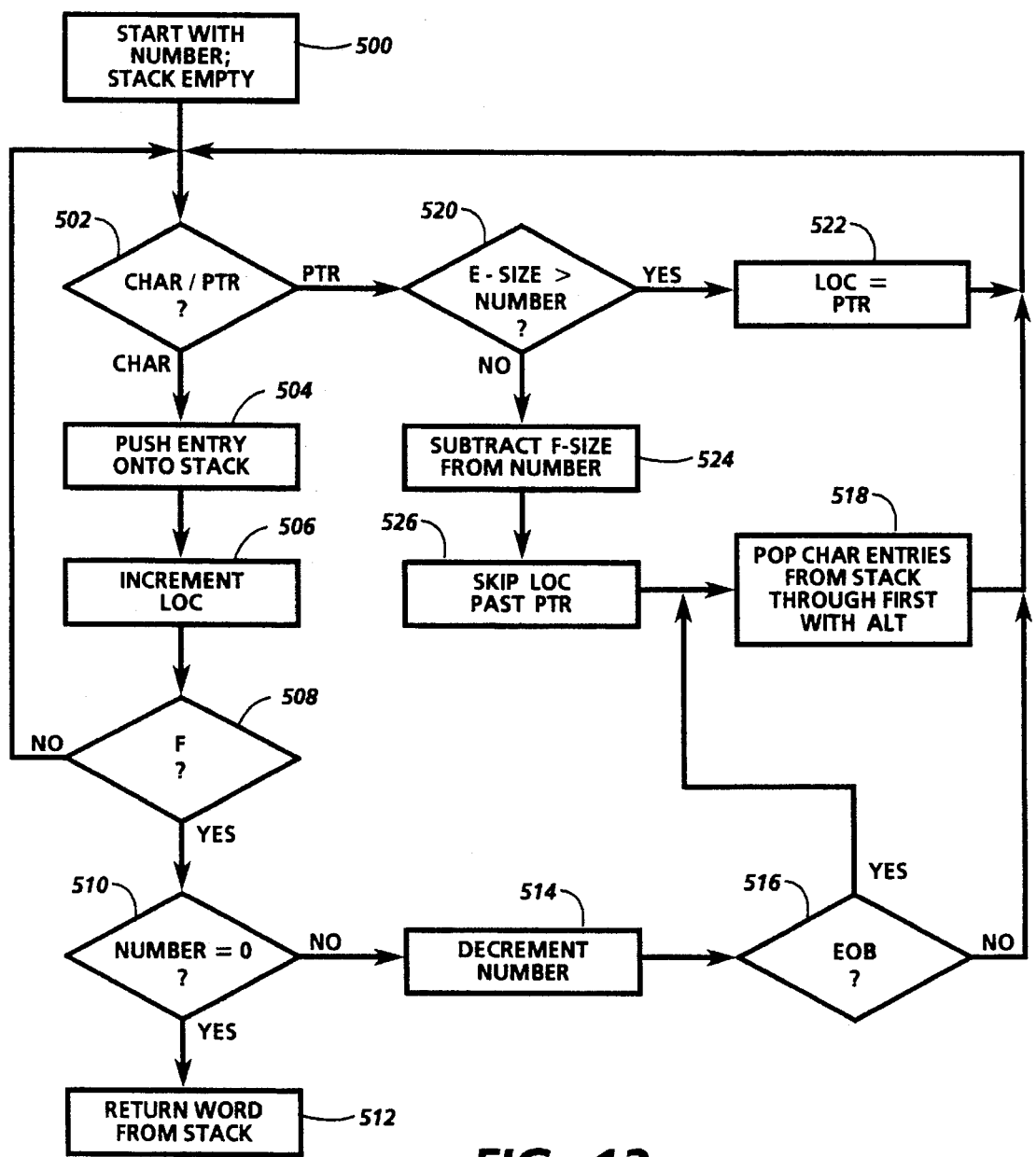
FIG. 13 is a flowchart showing a method of mapping a number to a word according to the invention.

N/W mapping may also be performed in a number of ways, provided that N/W mapping reverses W/N mapping. FIG. 13 shows a routine for N/W mapping which is appropriate for a word list stored as described above and for the W/N mapping techniques described above. In general, the routine of FIG. 13 scans through a stored word list, decrementing the number to be matched for each byte with set F data. The number reaches zero at the end of the word corresponding to the number being mapped, and that word is then returned.

In FIG. 13, N/W mapping begins in box 500 with a variable Number and an empty stack. This stack is managed by the routine of FIG. 13 so that it contains the word corresponding to the number being mapped when the routine ends. Therefore, all that is necessary to return the corresponding word is to unload and provide the contents of the stack.

In a simple word list like that of FIG. 2, it would be feasible to start at the first entry, with Number being the full number being mapped. In a larger word list, however, the number being mapped can be used to directly determine which is the first character of the word based on the first character table, which includes the number corresponding to the word immediately preceding the first word beginning with each character. The number being mapped can be compared with these first character numbers to find the largest one which is less than it, and the difference between the number being mapped and that first character number is the starting value of Number. The current location is then set to the first character transition of the character corresponding to that first character number. But if the number being mapped turned out to be greater than the number corresponding to the last word in the word list, nil is returned. Also, if the number being mapped is zero, the word list is initially tested to determine whether it accepts the null string, and if so the null string is returned. Ordinarily, however, the routine will proceed to the remainder of the routine shown in FIG. 13.

The test in box 502 determines whether the byte at the current location is a transition unit, i.e. has CHAR data, or is a pointer or pointer index. If it is a transition unit, the byte is pushed onto the stack, in box 504, and the location is incremented in box 506 to proceed to the next location in the FSM. If the test in box 508 determines that the transition unit's F data is set, the test in box 510 determines whether Number is equal to zero. When Number reaches zero, the word in the stack is provided in box 512 and mapping is completed. But if Number is not yet zero, Number is decremented in box 514. The test in box 516 then determines whether the transition unit's EOB data is set. If so, the character entries in the LIFO stack are deleted beginning with the most recently loaded until an entry with its ALT data set is reached, in box 518, because the word being sought does not have its ending in this branch. Then the routine returns to the test in box 502 for the byte at the next location.

If, on the other hand, the byte at the current location is a pointer or a pointer index, the test in box 520 compares the F-size of the branch to which that pointer or pointer index leads with Number. The F-size is either retrieved from its position relative to the pointer or, if the current location has a pointer index, from the lookup table entry corresponding to that index. If the F-size is greater than Number, the location is set in box 522 to the location indicated by the pointer or by the pointer retrieved using the pointer index, because the word sought ends within the branch of the word list which depends from the pointer. The byte at that location is then processed beginning with the test in box 502.

If the F-size is less than or equal to number, it is subtracted from Number in box 524, The routine proceeds in box 526 to the next location after the pointer or pointer index. In addition, the step in box 518 is performed as described above, to pop entries from the stack until one which has its ALT data set is reached. Then the routine returns to the test in box 502.

In returning the word from the stack in box 512, it is necessary to decode the encoded transition units to obtain the corresponding characters. If escape codes were used to encode the characters in the word list, as described above, decoding includes testing for escape codes. When an escape code is found, the number of consecutive escape codes is counted until a code which is not an escape code is found. The number of escape codes together with that code are then used in the character code table to find the output code for the appropriate character, such as an ASCII code.

Thus N/W mapping, like W/N mapping, is able to skip over branches of the word list while maintaining a count of word ends. Because an F-size is associated with each branch point with a skippable next branch, that F-size can be used to maintain the count. Also associated with each such branch point is the necessary information to skip over the next branch, and this information may be stored in the word list by encoding each pointer or pointer index so as to indicate its length and by positioning the alternative branch immediately after the pointer (with F-size annexed) or pointer index which leads to the skippable branch. As a result, the search can proceeed rapidly through the word list when mapping is in progress.

E. Applications

Figure 14:
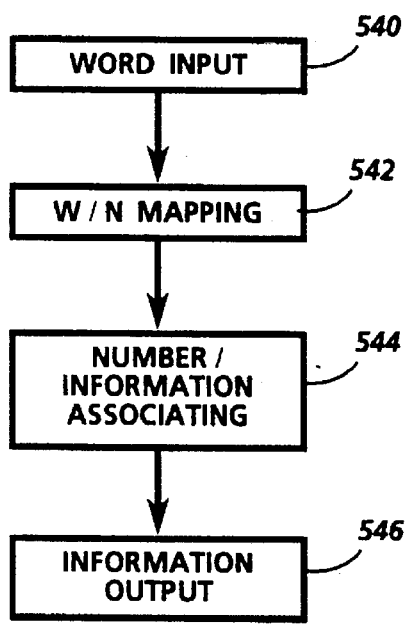
FIG. 14 is a functional block diagram of a technique for associating information with a word using word to number mapping according to the invention.
Figure 15:
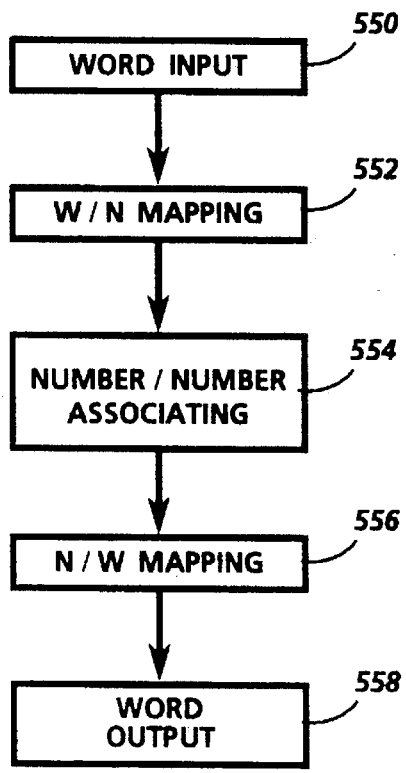
FIG. 15 is a functional block diagram of a technique for associating other words with a word using word to number and number to word mapping according to the invention.
Figure 16:
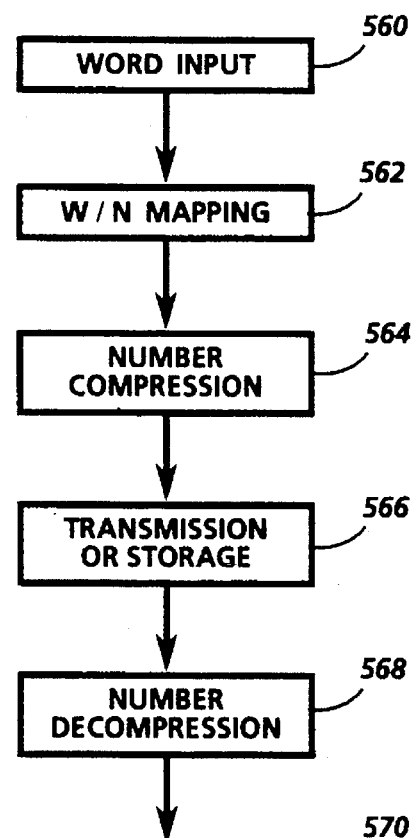
FIG. 16 is a functional block diagram of a technique for text compression and decompression using word to number and number to word mapping according to the invention.
Figure 16:
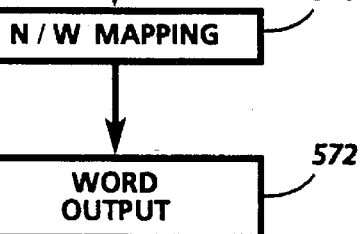

The invention is useful in diverse applications, some of which are shown in FIGS. 14–16.

FIG. 14 shows the functions of associating information with a word using W/N mapping according to the invention. In box 540, words are input, and each word is mapped in box 542. In box 544, each number is associated with corresponding information which is then output in box 546. One example of such an application would be a dictionary, with the technique of FIG. 14 being used to retrieve the definition of an input word.

FIG. 15 shows a variation of FIG. 14 in which the information associated with each number is one or more numbers corresponding to other words. Words are input in box 550 and mapped to numbers in box 552. Then, in box 554, each number is associated with other numbers which bear some relation to it. Those numbers are mapped back to words in box 556, and the resulting words are output in box 558. This technique may be used for obtaining related words such as synonyms and antonyms. A thesaurus using this technique is described in copending coassigned U.S. patent application Ser. No. 07/053,978, continued as Ser. No. 07/575,032, incorporated herein by reference. A translation capability could be provided, with the user typing in a word in one of a number of languages and the device responding with a number of groups of words, each including that word and synonymous words of other languages.

FIG. 16 illustrates how the invention could be used in text compression. A series of words to be compressed is received in box 560, and each word is mapped to a number in box 562. Then, the series of numbers is compressed using appropriate compression techniques which eliminate additional redundancy. The compressed data is then transmitted or stored in box 566, after which it is decompressed to a series of numbers, in box 568. These numbers are mapped to words in box 570, and the series of words is output in box 572 just as it was received.

F. Miscellaneous

A number of modifications of the invention may be advantageous under certain circumstances. In the encoding of the word list discussed above, the directed graph is encoded in the form of transition units, and those transition units which have a next branch and an alternative branch are branch points. If a state in the directed graph has a large number of outgoing transitions, it might be advantageous to associate the branching and suffix ending information with that state's corresponding branch point in the form of a table. Each entry of the table would correspond to one of the outgoing transitions, indicating the location of the branch depending from that transition and indicating an F-size. This F-size would not be the number of suffix endings in that branch but would be the F-size of all the branches which would be effectively skipped over if that branch were taken. During W/N mapping, the branch would be taken if that outgoing transition's character matched the next character of a word being searched. During W/N mapping, the branch would be taken if the associated F-size was the table's largest F-size smaller than the remaining number. The table entries could be ordered based on the characters of the outgoing transitions or in any other appropriate way.

As noted above, another variation would be to modify the branching information stored at a branch point. For example, a pointer could be stored to the alternative branch rather than to the next branch. This pointer could be a relative pointer such as the length of the next branch.

Another variation would be to modify the manner in which the suffix ending information is associated with the branch point. Rather than being annexed to the pointer to the next branch, the suffix ending number could be stored at the beginning of the next branch. If the next branch had three byte pointers to it, this would save one byte for each three byte pointer, though a greater saving of space might result from changing to two byte pointer indexes.

Many other modifications and variations of the invention will be apparent to one skilled in the art from the above description, the drawings and the claims. The scope of the invention is therefore not limited by the above description, but only by the attached claims.

What is claimed:

1. An article of manufacture for use in a machine that includes a processor, the article comprising:

memory for storing data, the data stored in the memory being accessible by the processor when the article is used in the machine; and mapping data stored in the memory; the mapping data indicating a set of strings of elements; the mapping data comprising;

data units arranged in a sequence and indicating information about strings in the set such that the mapping data can be used by the processor to perform mapping between each string in the set and a respective number by keeping count os suffix endings; the data units including:

a branching subsequence of data units from which the processor can continue to any of N branch subsequences of data units during mapping, where N is greater than one; the N branch subsequences having an order;

branch skipping information that the processor can obtain from the branching subsequence; the branch skipping information indicating, for each of the N branch subsequences, a number of suffix endings;

the number of suffix endings for each branch subsequence being equal to a number of suffix endings that would be skipped if the processor skips the branch subsequences preceding the branch subsequence in the order; and branch taking information that the processor can obtain from the branching subsequence; the branch taking information indicating, for each of the N branch subsequences, a location at which the processor can access the branch subsequence;

the branch skipping information and the branch taking information together providing sufficient information that the processor can access any of the N branch subsequences, skip any branch subsequences that precede the accessed branch subsequence in the order, and keep a count of suffix endings that accurately reflects any suffix endings skipped.

2. The article of claim 1 in which the set of strings is a list of words.

3. The article of claim 1 in which N is two.

4. The article of claim 1 in which the mapping data further comprise a table that includes, for each of the N branch subsequences, a table entry that includes the branch skipping information and the branch taking information for the branch subsequence; the table being stored in the memory so that the processor can access the table from the branching subsequence and use the table entry for each branch subsequence to obtain a location in the memory at which the processor can access the branch subsequence and a number of suffix endings in branch subsequences preceding the branch subsequence in the order.

5. A method of operating a machine; the machine including:

memory for storing data;

a processor connected for accessing data stored in the memory; and mapping data stored in the memory; the mapping data indicating a set of strings of elements; the mapping data including;

data units arranged in a sequence and indicating information about strings in the set such that the mapping data can be used by the processor to perform mapping between each string in the set and a respective number by keeping count of suffix endings; the data units including:

a branching subsequence of data units from which the processor can continue to any of N branch subsequences of data units during mapping, where N is greater than one; the N branch subsequences having an order;

branch skipping information that the processor can obtain from the branching subsequence; the branch skipping information indicating, for each of the N branch subsequences, a number of suffix endings; the number of suffix endings for each branch subsequence being equal to a number of suffix endings that would be skipped if the processor skips the branch subsequences preceding the branch subsequence in the order; and branch taking information that the processor can obtain from the branching subsequence; the branch taking information indicating, for each of the N branch subsequences, a location at which the processor can access the branch subsequence;

the branch skipping information and the branch taking information together providing sufficient information that the processor can access any of the N branch subsequences, skip any branch subsequences that precede the accessed branch subsequence in the order, and keep a count of suffix endings that accurately reflects any suffix endings skipped;

the method comprising:

operating the processor to obtain a string of elements;

operating the processor to map the string of elements to a respective number; the string of elements including a prefix substring of elements and a suffix substring of elements; the act of operating the processor to map the string of elements comprising:

using the prefix substring of elements to access the branching subsequence and obtain a prefix count of suffix endings;

using the suffix substring of elements to obtain branch indicating data indicating a first one of the N branch subsequences in which to continue mapping;

using the branch indicating data to obtain the branch skipping information and the branch taking information for the first branch subsequence;

using the branch skipping information for the first branch subsequence and the prefix count of suffix endings to obtain an updated count of suffix endings; the updated count indicating the sum of the prefix count and the number of suffix endings that would be skipped if the processor skips the branch subsequences preceding the first branch subsequence in the order; and using the branch taking information for the first branch subsequence to access the first branch subsequence to continue mapping.

6. A method of operating a machine; the machine including:

memory for storing data;

a processor connected for accessing data stored in the memory; and mapping data stored in the memory; the mapping data indicating a set of strings of elements; the mapping data including;

data units arranged in a sequence and indicating information about strings in the set such that the mapping data can be used by the processor to perform mapping between each string in the set and a respective number by keeping count of suffix endings; the data units including:

a branching subsequence of data units from which the processor can continue to any of N branch subsequences of data units during mapping, where N is greater than one; the N branch subsequences having an order;

branch skipping information that the processor can obtain from the branching subsequence; the branch skipping information indicating, for each of the N branch subsequences, a number of suffix endings; the number of suffix endings for each branch subsequence being equal to a number of suffix endings that would be skipped if the processor skips the branch subsequences preceding the branch subsequence in the order; and branch taking information that the processor can obtain from the branching subsequence; the branch taking information indicating, for each of the N branch subsequences, a location at which the processor can access the branch subsequence;

the branch skipping information and the branch taking information together providing sufficient information that the processor can access any of the N branch subsequences, skip any branch subsequences that precede the accessed branch subsequence in the order, and keep a count of suffix endings that accurately reflects any suffix endings skipped;

the method comprising:

operating the processor to obtain a number;

operating the processor to map the number to a respective string of elements; the respective string including a prefix substring of elements and a suffix substring of elements; the act of operating the processor to map the number comprising:

using the number to access the branching subsequence, to obtain a count of remaining suffix endings, and to obtain the prefix substring of elements;

using the count of remaining suffix endings and the branch skipping information of the N branch subsequences to obtain branch indicating data indicating a first one of the N branch subsequences in which to continue mapping;

using the branch indicating data to obtain the branch skipping information and the branch taking information for the first branch subsequence;

using the branch skipping information for the first branch subsequence and the count of remaining suffix endings to obtain an updated count of remaining suffix endings; the updated count indicating a result of subtracting, from the count of remaining suffix endings, the number of suffix endings that would be skipped if the processor skips the branch subsequences preceding the first branch subsequence in the order; and using the branch taking information for the first branch subsequence to access the first branch subsequence to continue mapping.

* * * * *